United States Patent
Warren et al.

(10) Patent No.: US 9,390,354 B2
(45) Date of Patent: Jul. 12, 2016

(54) METHOD FOR PRINTING AN UPSCALED IMAGE

(71) Applicant: CANON KABUSHIKI KAISHA, Tokyo (JP)

(72) Inventors: Stuart James Warren, Naremburn (AU); Christian Bruwer, Westmead (AU); Giles Anderson Puckett, Samford (AU)

(73) Assignee: CANON KABUSHIKI KAISHA, Tokyo (JP)

(*) Notice: Subject to any disclaimer, the term of this patent is extended or adjusted under 35 U.S.C. 154(b) by 5 days.

(21) Appl. No.: 14/452,232

(22) Filed: Aug. 5, 2014

(65) Prior Publication Data

US 2015/0043015 A1 Feb. 12, 2015

(30) Foreign Application Priority Data

Aug. 6, 2013 (AU) .............................. 2013213660

(51) Int. Cl.
*G06K 15/02* (2006.01)
*G06T 3/40* (2006.01)
*H04L 29/06* (2006.01)
*H04N 1/40* (2006.01)

(52) U.S. Cl.
CPC ............ *G06K 15/1856* (2013.01); *G06T 3/403* (2013.01); *H04N 1/40068* (2013.01); *G06K 15/1843* (2013.01); *H04L 69/04* (2013.01); *H04N 1/40* (2013.01)

(58) Field of Classification Search
None
See application file for complete search history.

(56) References Cited

U.S. PATENT DOCUMENTS

| | | | | |
|---|---|---|---|---|
| 4,394,693 | A * | 7/1983 | Shirley ................ | G03F 7/70358 346/3 |
| 6,298,166 | B1 * | 10/2001 | Ratnakar ................... | G06T 3/60 375/E7.206 |
| 7,170,628 | B2 | 1/2007 | Kumar et al. | |
| 7,280,710 | B1 * | 10/2007 | Castro-Pareja et al. ....... | 382/303 |
| 8,036,273 | B2 * | 10/2011 | Karczewicz et al. .... | 375/240.17 |
| 8,751,555 | B2 * | 6/2014 | Mohamed et al. ............ | 708/497 |
| 2004/0120006 | A1 * | 6/2004 | Kumar et al. ................ | 358/1.16 |
| 2006/0050093 | A1 * | 3/2006 | Soroushi ................ | G09G 5/391 345/667 |
| 2013/0121416 | A1 * | 5/2013 | He et al. ................... | 375/240.14 |

* cited by examiner

*Primary Examiner* — Miya J Cato
(74) *Attorney, Agent, or Firm* — Canon USA, Inc. IP Division

(57) ABSTRACT

Disclosed is a method of printing a transformed image corresponding to a source image. The method determines at least a first scale factor to upscale the source image to generate the transformed image, the first scale factor being at a first mathematical precision. The source image is enlarged along at least one edge of said source image edges and pixel data is copied along the source image edges into the enlarged area of the enlarged source image. The method maps each pixel of the transformed image back to a corresponding pixel into the enlarged source image including the copied pixel data along the edge of the source image. The method may determine a second scale factor, the second scale factor being at a second mathematical precision, wherein each pixel of the transformed image is mapped back to a corresponding pixel in the enlarged source image using the second scale factor.

15 Claims, 17 Drawing Sheets

METHOD FOR PRINTING AN UPSCALED IMAGE

REFERENCE TO RELATED PATENT APPLICATION(S)

This application claims the benefit under 35 U.S.C. §119 of the filing date of Australian Patent Application No. 2013213660, filed Aug. 6, 2013, hereby incorporated by reference in its entirety as if fully set forth herein.

TECHNICAL FIELD

The current invention relates to the field of raster image processing and, in particular, to the upscaling of images in a printing system.

BACKGROUND

Images are commonly reproduced in printing systems, typically by including the image data in a Page Description Language (PDL) file format such as Adobe Portable Document Format (PDF) or Microsoft XML Paper Specification (XPS). PDLs, including XPS and PDF, allow one or more user-defined transformations (or transforms) to be applied to the image that allows the image to be positioned and scaled on the page on which the image is to be printed. Where multiple transforms are specified, the PDL interpreter typically multiplies the transformations together to generate a single transform. The resulting transform is usually expressed in floating point precision. The printing of the PDL data file generally involves (1) interpreting the page-specific data described in the PDL data, including images, and (2) converting (also known as rendering) the data to an output raster. The output raster is used by the print engine to mark the page, a process that usually involves the application of ink or toner to a paper print medium.

It is important that the conversion of PDL data to the output raster is efficient to maintain high printing speeds while also minimising the CPU resources required to perform the conversion. CPU resources include the memory (RAM) available to the CPU, the speed that the CPU is able to access the memory (known as bandwidth) and the CPU's processing ability. Image printing is affected by these three resources as each element (or pixel) in the image is stored in memory, accessed and translated in the printing of the image. Where the resolution of the printed image is higher than the resolution of the image data, it is necessary for the renderer to upscale the image. This often involves reading each image pixel multiple times in conjunction with an upscaling algorithm. The upscaling algorithm may simply copy the pixel to the output raster multiple times. More complex upscaling methods may also be used, such as bilinear or bicubic interpolation.

To ensure the high performance and accuracy of the image rendering pipeline in a printing system it is common to perform an inverting operation on the transform that positions the image on the page. The result of the inverting operation is an inverse transform, specified in a floating point format, which maps a position in the output raster to a pixel in the image. While it is possible to use the floating point inverse transform during the rendering process, the operation to map a position in the output raster to a pixel in the image is often performed using integer arithmetic. Traditionally floating point operations have been either slow, or unsupported by processors typically used in renderers. While modern processors can have high performance floating point capability, their integer performance is often much faster and, as a result, techniques pioneered in the early days of computer graphics are equally applicable in modern renderers. The use of a second precision for expressing the inverse transform as an integer allows floating point calculations to be avoided when mapping each pixel of the image.

A difficulty arises when a position in the output raster is mapped to a pixel outside the image using the inverse transform. If not handled correctly, selecting a pixel outside the image will result in either incorrect image data being used or possibly an invalid memory access by the CPU. This situation can occur when calculation errors are introduced in the mapping process. Both the inversion process and the use of two different mathematical precisions lead to small errors when mapping from the raster output to a pixel in the image. If the image is scaled down, the error may be more than one pixel.

A widely used technique developed by early graphics software developers, known as 'clamping', may be used to prevent accessing a pixel outside the image. Clamping limits (or 'clamps') operate on the selected image pixel coordinate (x,y) so it is always within the image dimensions (w, h) and is achieved using a simple test:

```
if (x < 0)
    x = 0;
else if (x >= w)
    x = w-1;
if (y < 0)
    y = 0;
else if (y >= h)
    y = h-1;
```

A limitation of the algorithm described is that each pixel must be checked, requiring extra operations per pixel when rendering the image and requires branching operations. Both aspects reduce the performance of the image rendering part of the system. A modified version of the algorithm applies the clamping method only to the pixels located at the perimeter of the image.

Ideally the clamping step would be removed altogether to further improve the performance of the rendering system. One technique used in the field involves a step prior to rendering where pixels along the edge of the image in the output raster are determined and mapped back to pixels in the image. Pixels that map to outside the image are then used to adjust the inverse transform such that when the adjusted inverse transform is used by the renderer, only pixels within the image will be accessed. This method removes the need for the renderer to perform clamping, however it requires additional computation to be performed by the PDL interpreter when generating the display list for the renderer.

Ideally the clamping step would be removed completely such that no clamping or coordinate checking is required.

SUMMARY

Described is a technique that is effective when upscaling images and is based on an observation of the inventor's that when upscaling, the error in mapping pixels arising from the inversion of the drawing transform of an image and the use of two different mathematical precisions is very small and is never greater than one pixel in the image. That is, if there is a calculation error for any pixel in the image, a neighbouring pixel will be selected.

Instead of clamping or computing coordinates around the image, the presently disclosed arrangements enlarge the image slightly (1 pixel at each side of the image), and copy the image data along the edges into the enlarged area. This is a computationally inexpensive operation because it can be done as the image data is copied into the display list memory, and only slightly increases the memory consumed.

The amount of extra memory needed can be minimised in a number of situations, such as when the image is compressed using a lossy format, or if a small number of bits are used to express each pixel.

Ideally compressed images would be written directly into the display list. Typical implementations require that the image to be compressed; however in the case of JPEG compressed images, the operation can be performed without decompression by using a manipulation of the Huffman-encoded bitstream.

According to one aspect of the present disclosure there is provided a method of printing an transformed image corresponding to a source image, the method comprising:

determining at least a first scale factor to upscale said source image to generate said transformed image, said first scale factor being at a first mathematical precision; enlarging said source image along at least one edge of said source image edges;

copying pixel data along said source image edges into the enlarged area of said enlarged source image; and mapping each pixel of said transformed image back to a corresponding pixel into the enlarged source image including the copied pixel data along the edge of the source image.

Preferably the method further comprises determining a second scale factor, said second scale factor being at a second mathematical precision, wherein each pixel of said transformed image is mapped back to a corresponding pixel in said enlarged source image using said second scale factor.

Desirably the enlarging step comprises copying entropy coded data and the second copying step involves copying and flipping the entropy coded data in an enlarged portion of the enlarged source image.

According to one aspect of the present disclosure there is provided a method of printing a geometrically transformed image corresponding to a source image, the method comprising:

determining a first scale factor to upscale said source image to generate the transformed image, the first scale factor being at a first mathematical precision;

determining a second scale factor to map each pixel of said transformed image back to a corresponding pixel in the source image, the second scale factor being at a second mathematical precision;

determining a portion of each line in the transformed image that corresponds to valid image data in said source image using said first scale factor;

for a portion of said line that corresponds to valid image data, mapping each pixel of said transformed image back to a corresponding pixel in said source image using said second scale factor, and (first) copying said image pixel to said line in said transformed image; and for a portion or portions of said line that does not correspond to valid image data, (second) copying the image pixel at the nearest end of said valid portion of said source image to said line in said transformed image.

In a preferred implementation, each pixel of said transformed image is mapped back to a corresponding pixel in said enlarged source image using said second scale factor.

Desirably the first copying step involves copying entropy coded data, and the second copying step involves copying and flipping the entropy coded data.

In either method, a geometric transformation by which the transformed image is formed is one or more of: upscaling, rotation, shearing.

Other aspects are also disclosed.

BRIEF DESCRIPTION OF THE DRAWINGS

At least one embodiment of the invention will now be described with reference to the following drawings, in which.

DETAILED DESCRIPTION INCLUDING BEST MODE

Context

Figure 1:
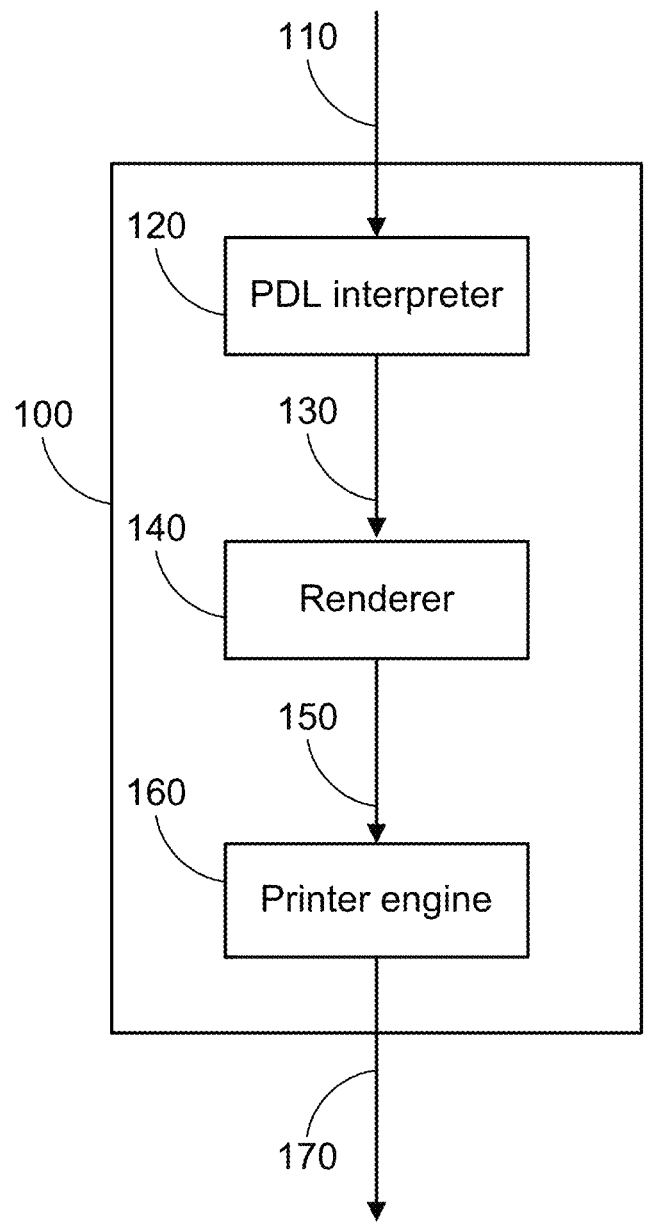
FIG. 1 is a schematic block diagram of a print forming apparatus on which the disclosed arrangements may be practised.

FIG. 1 is a schematic block diagram of a print forming apparatus 100 with which the presently disclosed arrangements may be performed. Print forming apparatus 100 is shown containing a PDL interpreter 120, a renderer 140 and a printer engine 160. PDL interpreter 120 receives instructions defining a page to be printed by way of a page description language (PDL) document 110, producing display list 130 to be rendered by renderer 140. The renderer 140 rasterises the contents of display list 130, producing an output raster 150. The rasterised format is transferred to the printer engine 160 for printing and the production of a printed output 170. The PDL interpreter 120 and the renderer 140 execute on systems that typically have limited CPU resources. Typically PDL interpreter 120 would normally use a floating point precision (first mathematical precision) when determining the page coordinates of objects (including images) drawn by the PDL instructions during construction of the display list 130. The renderer 140 may use a second scale factor determined at a second mathematical precision which is not more precise than the first mathematical precision, such as an integer-based fixed-point precision to maximise performance during image rasterisation.

Figure 16A:
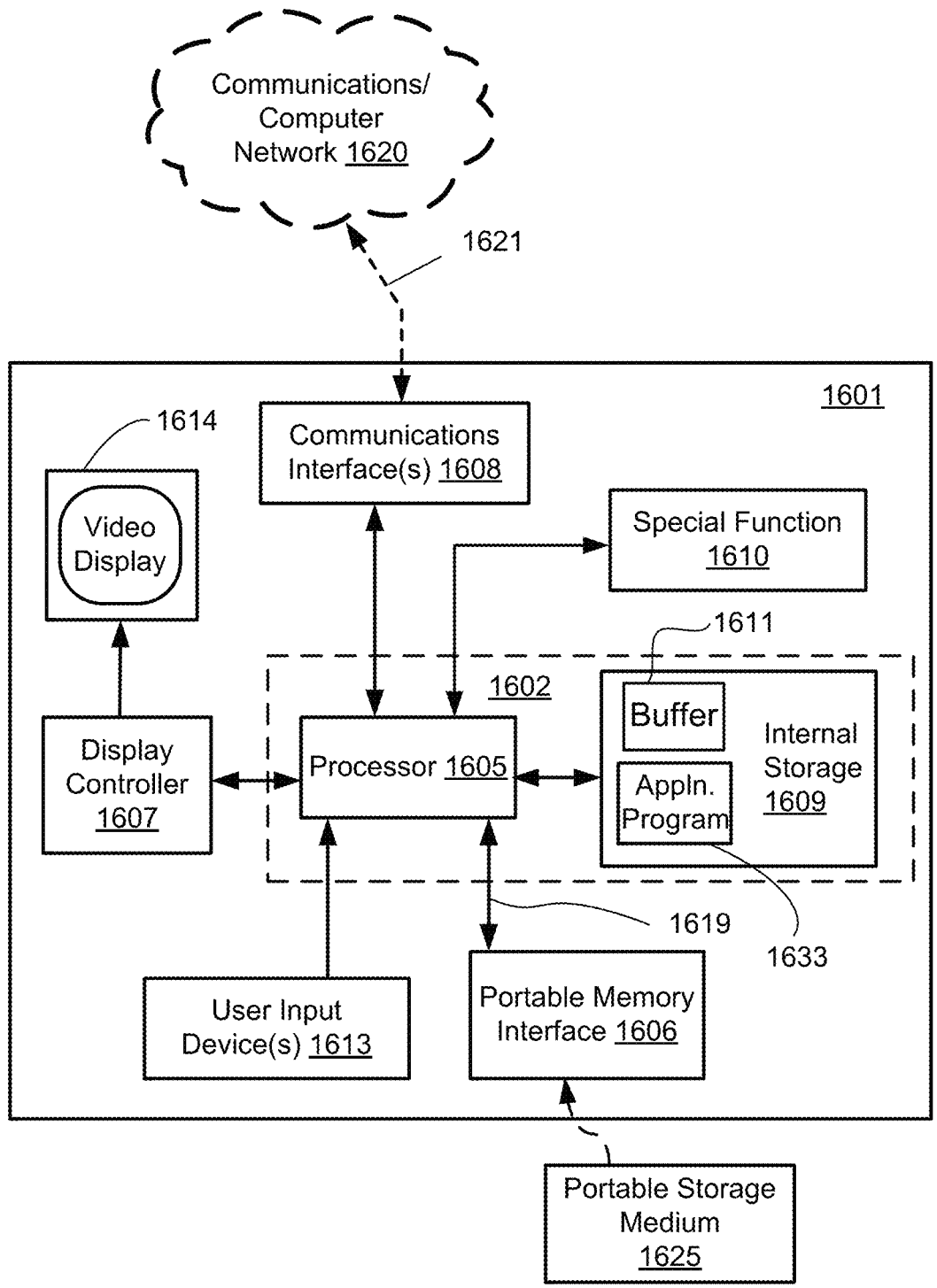
FIGS. 16A and 16B collectively form a schematic block diagram representation of an electronic device upon which described arrangements can be practised.
Figure 16B:
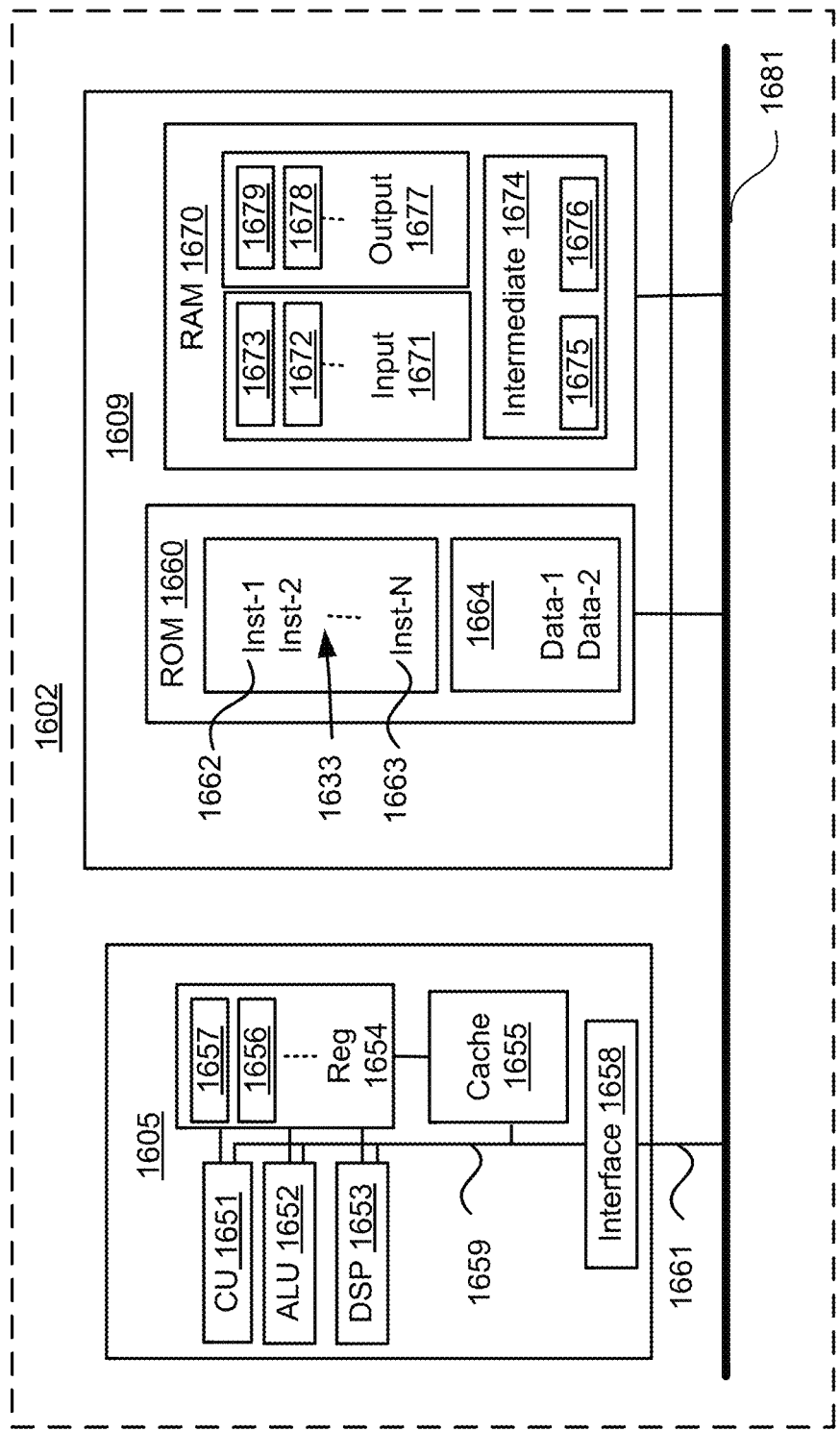

FIGS. 16A and 16B collectively form a schematic block diagram of a general purpose electronic device 1601 including embedded components, upon which the scaling, rendering and printing methods to be described are desirably practiced. The device 1601 may be considered a specific example of the print forming apparatus 100. The electronic device 1601 may be, for example, a printer or a multi-function device (such as a copier, including both a printer and a scanner) in which processing resources are limited. Nevertheless, the methods to be described may also be performed on higher-level devices such as desktop computers, server computers, and other such devices with significantly larger processing resources.

As seen in FIG. 16A, the electronic device 1601 comprises an embedded controller 1602. Accordingly, the electronic device 1601 may be referred to as an "embedded device." In the present example, the controller 1602 has a processing unit (CPU or processor) 1605 which is bi-directionally coupled to an internal storage module 1609. The storage module 1609 may be formed from non-volatile semiconductor read only memory (ROM) 1660 and semiconductor random access memory (RAM) 1670, as seen in FIG. 16B. The RAM 1670 may be volatile, non-volatile or a combination of volatile and non-volatile memory.

The electronic device 1601 includes a display controller 1607, which is connected to a video display 1614, such as a liquid crystal display (LCD) panel or the like. The display controller 1607 is configured for displaying graphical images on the video display 1614 in accordance with instructions received from the embedded controller 1602, to which the display controller 1607 is connected.

The electronic device 1601 also includes user input devices 1613 which are typically formed by keys, a keypad or like controls. In some implementations, the user input devices 1613 may include a touch sensitive panel physically associated with the display 1614 to collectively form a touch-screen. Such a touch-screen may thus operate as one form of graphical user interface (GUI) as opposed to a prompt or menu driven GUI typically used with keypad-display combinations. Other forms of user input devices may also be used, such as a microphone (not illustrated) for voice commands or a joystick/thumb wheel (not illustrated) for ease of navigation about menus.

As seen in FIG. 16A, the electronic device 1601 also comprises a portable memory interface 1606, which is coupled to the processor 1605 via a connection 1619. The portable memory interface 1606 allows a complementary portable memory device 1625 to be coupled to the electronic device 1601 to act as a source or destination of data or to supplement the internal storage module 1609. Examples of such interfaces permit coupling with portable memory devices such as Universal Serial Bus (USB) memory devices, Secure Digital (SD) cards, Personal Computer Memory Card International Association (PCMIA) cards, optical disks and magnetic disks.

The electronic device 1601 also has a communications interface 1608 to permit coupling of the device 1601 to a computer or communications network 1620 via a connection 1621, for example for receipt of the PDL document 110. The connection 1621 may be wired or wireless. For example, the connection 1621 may be radio frequency or optical. An example of a wired connection includes Ethernet. Further, an example of wireless connection includes Bluetooth™ type local interconnection, Wi-Fi (including protocols based on the standards of the IEEE 802.11 family), Infrared Data Association (IrDa) and the like.

Typically, the electronic device 1601 is configured to perform some special function, which in this case at least includes printing. The embedded controller 1602, in conjunction with further special function components 1610 representative of at least the printer engine 160, are provided to perform that special function. The special function components may further include the renderer 140 or components thereof, when formed in a specific hardware implementation. Otherwise, the renderer 140 may be performed by software executable by the embedded controller 1602. The special function components 1610 is connected to the embedded controller 1602.

The methods described hereinafter may be implemented using the embedded controller 1602, where the processes of FIGS. 2 to 15 may be implemented as one or more software application programs 1633 executable within the embedded controller 1602. The electronic device 1601 of FIG. 16A implements the described methods. In particular, with reference to FIG. 16B, the steps of the described methods are effected by instructions in the software 1633 that are carried out within the controller 1602. The software instructions may be formed as one or more code modules, each providing a means for performing one or more particular tasks. The software may also be divided into two separate parts, in which a first part and the corresponding code modules performs the described methods and a second part and the corresponding code modules provide means to manage a user interface between the first part and the user.

The software 1633 of the embedded controller 1602 is typically stored in the non-volatile ROM 1660 of the internal storage module 1609. The software 1633 stored in the ROM 1660 can be updated when required from a computer readable medium. The software 1633 can be loaded into and executed by the processor 1605. In some instances, the processor 1605 may execute software instructions that are located in RAM 1670. Software instructions may be loaded into the RAM 1670 by the processor 1605 initiating a copy of one or more code modules from ROM 1660 into RAM 1670. Alternatively, the software instructions of one or more code modules may be pre-installed in a non-volatile region of RAM 1670 by a manufacturer. After one or more code modules have been located in RAM 1670, the processor 1605 may execute software instructions of the one or more code modules.

The application program 1633 is typically pre-installed and stored in the ROM 1660 by a manufacturer, prior to distribution of the electronic device 1601. However, in some instances, the application programs 1633 may be supplied to the user encoded on one or more CD-ROM (not shown) and read via the portable memory interface 1606 of FIG. 16A prior to storage in the internal storage module 1609 or in the portable memory 1625. In another alternative, the software application program 1633 may be read by the processor 1605 from the network 1620, or loaded into the controller 1602 or the portable storage medium 1625 from other computer readable media. Computer readable storage media refers to any non-transitory tangible storage medium that participates in providing instructions and/or data to the controller 1602 for execution and/or processing. Examples of such storage media include floppy disks, magnetic tape, CD-ROM, a hard disk drive, a ROM or integrated circuit, USB memory, a magneto-optical disk, flash memory, or a computer readable card such as a PCMCIA card and the like, whether or not such devices are internal or external of the device 1601. Examples of transitory or non-tangible computer readable transmission media that may also participate in the provision of software, application programs, instructions and/or data to the device 1601 include radio or infra-red transmission channels as well as a network connection to another computer or networked device, and the Internet or Intranets including e-mail transmissions and information recorded on Websites and the like. A computer readable storage medium having such software or computer program recorded on it is a computer program product.

The second part of the application programs 1633 and the corresponding code modules mentioned above may be executed to implement one or more graphical user interfaces (GUIs) to be rendered or otherwise represented upon the display 1614 of FIG. 16A. Through manipulation of the user input device 1613 (e.g., the keypad), a user of the device 1601 and the application programs 1633 may manipulate the interface in a functionally adaptable manner to provide controlling commands and/or input to the applications associated with the GUI(s). Other forms of functionally adaptable user interfaces may also be implemented, such as an audio interface utilizing speech prompts output via loudspeakers (not illustrated) and user voice commands input via the microphone (not illustrated).

FIG. 16B illustrates in detail the embedded controller 1602 having the processor 1605 for executing the application programs 1633 and the internal storage 1609. The internal storage 1609 comprises read only memory (ROM) 1660 and random access memory (RAM) 1670. The processor 1605 is able to execute the application programs 1633 stored in one or both of the connected memories 1660 and 1670. When the electronic device 1601 is initially powered up, a system program resident in the ROM 1660 is executed. The application program 1633 permanently stored in the ROM 1660 is sometimes referred to as "firmware". Execution of the firmware by the processor 1605 may fulfil various functions, including processor management, memory management, device management, storage management and user interface.

The processor 1605 typically includes a number of functional modules including a control unit (CU) 1651, an arithmetic logic unit (ALU) 1652 and a local or internal memory comprising a set of registers 1654 which typically contain atomic data elements 1656, 1657, along with internal buffer or cache memory 1655. One or more internal buses 1659 interconnect these functional modules. The processor 1605 typically also has one or more interfaces 1658 for communicating with external devices via system bus 1681, using a connection 1661.

The application program 1633 includes a sequence of instructions 1662 through 1663 that may include conditional branch and loop instructions. The program 1633 may also include data, which is used in execution of the program 1633. This data may be stored as part of the instruction or in a separate location 1664 within the ROM 1660 or RAM 1670.

In general, the processor 1605 is given a set of instructions, which are executed therein. This set of instructions may be organised into blocks, which perform specific tasks or handle specific events that occur in the electronic device 1601. Typically, the application program 1633 waits for events and subsequently executes the block of code associated with that event. Events may be triggered in response to input from a user, via the user input devices 1613 of FIG. 16A, as detected by the processor 1605. Events may also be triggered in response to other sensors and interfaces in the electronic device 1601.

The execution of a set of the instructions may require numeric variables to be read and modified. Such numeric variables are stored in the RAM 1670. The disclosed method uses input variables 1671 that are stored in known locations 1672, 1673 in the memory 1670. The input variables 1671 are processed to produce output variables 1677 that are stored in known locations 1678, 1679 in the memory 1670. Intermediate variables 1674 may be stored in additional memory locations in locations 1675, 1676 of the memory 1670. Alternatively, some intermediate variables may only exist in the registers 1654 of the processor 1605.

The execution of a sequence of instructions is achieved in the processor 1605 by repeated application of a fetch-execute cycle. The control unit 1651 of the processor 1605 maintains a register called the program counter, which contains the address in ROM 1660 or RAM 1670 of the next instruction to be executed. At the start of the fetch execute cycle, the contents of the memory address indexed by the program counter is loaded into the control unit 1651. The instruction thus loaded controls the subsequent operation of the processor 1605, causing for example, data to be loaded from ROM memory 1660 into processor registers 1654, the contents of a register to be arithmetically combined with the contents of another register, the contents of a register to be written to the location stored in another register and so on. At the end of the fetch execute cycle the program counter is updated to point to the next instruction in the system program code. Depending on the instruction just executed this may involve incrementing the address contained in the program counter or loading the program counter with a new address in order to achieve a branch operation.

Each step or sub-process in the processes of the methods described below is associated with one or more segments of the application program 1633, and is performed by repeated execution of a fetch-execute cycle in the processor 1605 or similar programmatic operation of other independent processor blocks in the electronic device 1601.

Overview

Described is a method for efficiently upscaling an image to generate an output raster. Print forming apparatuses have limited CPU resources for processing PDL data and image data contained in PDL data can often be large, requiring significant processing to scale, or otherwise transform, the image to correctly position the image on the page to be printed. Numerical errors in the image transforming process may require a check to be performed to ensure that only pixels within the image are accessed. The method removes the need for this checking step by enlarging the image by one (1) pixel along each edge, guaranteeing that the numerical errors computed along the edge of the image will always result in the use of a valid pixel.

Implementation 1

Figure 2:
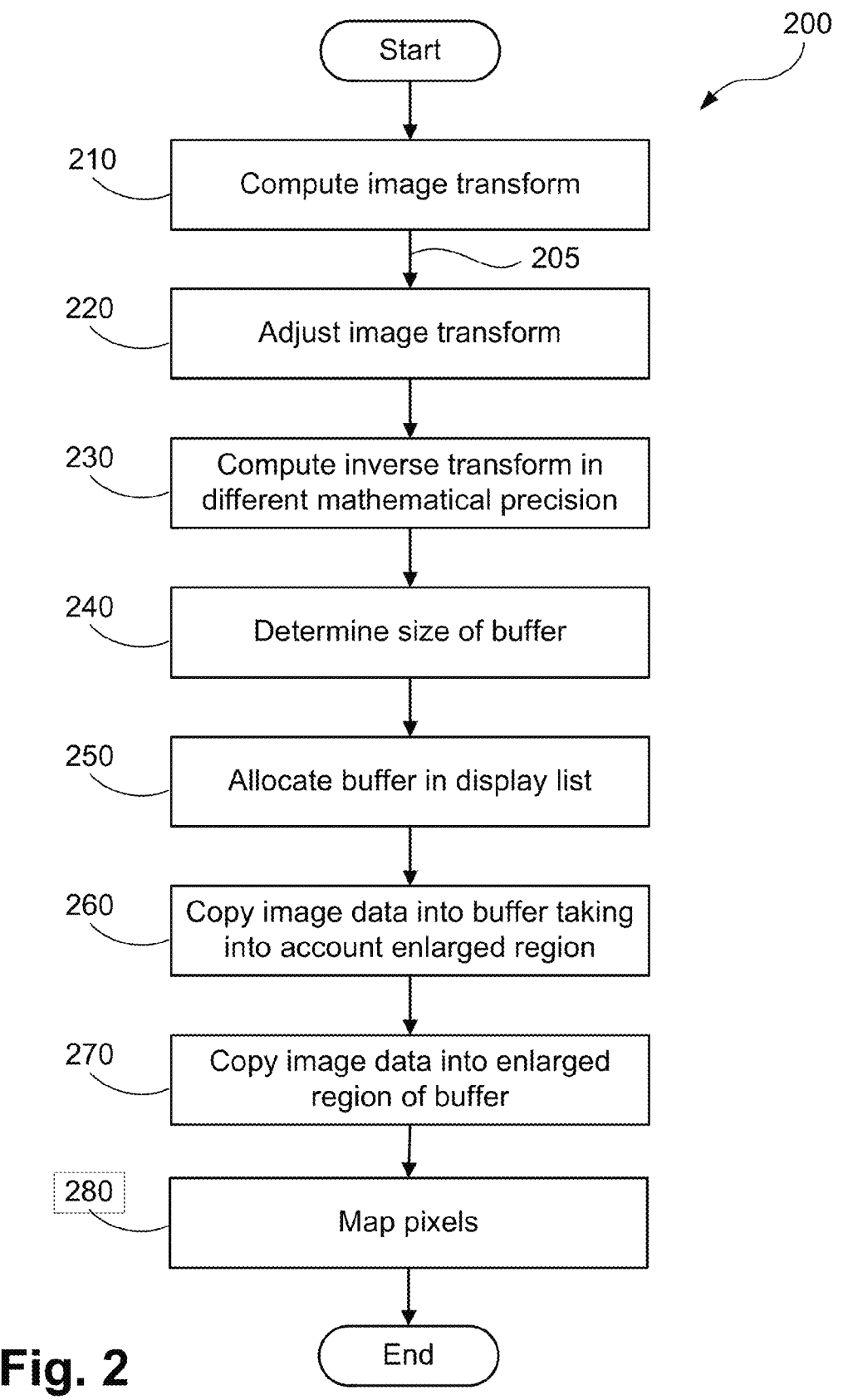
FIG. 2 is a flowchart of a method of transforming an image for printing according to the present disclosure.

FIG. 2 is a flow chart of a method 200 that illustrates how artefacts can be avoided when upscaling an image using different precisions during the interpreting and rendering stages of FIG. 1. The method 200 is able to be wholly executed by the PDL interpreter 120, and thus typically is performed by the embedded controller 1602 executing program code. The placement of an upscaled image on the output raster is controlled by the PDL data, forming the PDL document 100, and can be expressed as an affine transform. The transform is often expressed using either single or double floating-point precision and specifies the position and scaling of the image in the drawing coordinate system. Other transformations must be considered depending on the capabilities of the PDL interpreter 120 and the printer engine 160, including 1) the conversion of the drawing coordinate system to pixels in the output raster, and 2) how the page is placed on the raster—for example, whether more than one page of the PDL data is printed on a single page. In a first step 210 of the method 200 the transformations are combined by the PDL interpreter 120 to compute a first single transformation 205 that defines how the image is positioned and upscaled on the output raster. The single transformation includes a first scaling factor. The use of floating point precision in the transforms contained in the PDL data makes it necessary to use floating point precision in the step 210 to avoid the introduction of errors in the combined drawing transform. If available on the CPU 1605, the use of double-precision floating point operations is preferred.

The image transform 205 is then adjusted in step 220 to compensate for an increase in the image dimensions as it is copied into the display list 130 in later steps 240, 260 and 270. In these later steps, the image is enlarged by 1 pixel around the perimeter of the image. To preserve the position of the top-left corner (0, 0) of the input image, the top left corner of the enlarged image is considered to be located at (−1, −1) in the coordinate space of the image. Image transform $T_{(x, y)}$ must be adjusted such that $T_{(-1, -1)}$ is the new location of the image on the page. Where the image transform T is expressed as an affine transform comprising the coefficients ($s_x$, $r_x$, $s_y$, $r_y$, $t_x$, $t_y$), this adjustment step can be achieved by updating $t_x$ and $t_y$ with $T_{(-1,-1)}$. In an alternate implementation, the adjustment is done on the inverse transform computed in step 230.

The inverse of the image transform, being a second transform comprising a second scale factor is then computed and converted from floating point precision into a fixed-point format in step 230, thereby affording a second mathematical precision. It is both computationally and resource-efficient for the renderer 140 to use the inverse of the image transform when writing the image to the output raster. Additional performance gains can be achieved by using integer operations when rasterising images in the renderer 140 instead of the floating point operations used by the PDL interpreter. After inversion, the resulting matrix is converted to a fixed-point format, preferably using at least 32-bit signed integers. For example, a suitable fixed-point format may be to use the least significant 20 bits for the fractional component of each coefficient of the inverse transform. However there may be more efficient fixed point representations that can be used. The integer-based fixed-precision inverse transform is then written to the display list 130 for later use by the renderer 140.

A side effect of combining multiple transforms in step 210, computing the inverse transform in step 230, and converting the inverse transform to a fixed-point format (also done in step 230), is the introduction of an error when mapping a pixel from the output raster back to the image to be printed. To prevent the need for the renderer 140 to check whether a location outside the image has been calculated, the method 200 operates so that the image stored in the display list 130 is slightly larger than the original image. The image is stored in a buffer 1611 within the display list 130, the buffer 1611 typically being formed within the internal storage 1609 of the embedded controller 1602 in which the display list 130 is also stored. The size of the buffer 1611 is computed in step 240 of the method 200 based on the original image size ($I_{width}$, $I_{height}$), such that the buffer will be large enough to store at least ($I_{width}$+2)*($I_{height}$+2) pixels. Display list memory is then allocated for the buffer 1611 in step 250. At this stage of the method 200, the buffer 1611 has been sized to allow the addition of an extra row of pixels at the top and bottom sides of the image, and an extra column of pixels at the left and right sides of the image. A copying process is then performed in step 260 to copy the image data such that no image data is written to the memory locations (bytes) in the buffer 1611 representing the additional rows and columns.

An additional copying step 270 then copies the pixels along the edge of the image into the adjacent enlarged image region in the allocated buffer 1611. This step is listed in FIG. 2 after step 260 for the purposes of explanation. However, in many cases it is more efficient to implement the additional copying step 270 during step 260 as each line of image data is copied into the buffer 1611. The inventors note at this stage that the additional copying step 270 is similar to a process required when using JPEG to compress images where an image dimension is not a multiple of 8 pixels (the dimension of a JPEG Minimally Coded Unit (MCU)). To minimise compression artefacts in this case, it is common to round the image dimension up to a multiple of 8 pixels and initialise the enlarged region of the image with the nearest pixel of the image. A mapping step 280 maps each pixel of the transformed image generated at step 210 into the enlarged source image including the copied pixel data along the edges of the source image edges.

In addition to the buffer 1611, other parameters relating to the printing of the image may be written to the display list 130, including clipping mechanism that restricts the image to the desired position on the page. The renderer 140 can render the display list 130 once the display list 130 has been finalised. Printing of the display list may then be performed by the print engine 160.

Figure 3A:
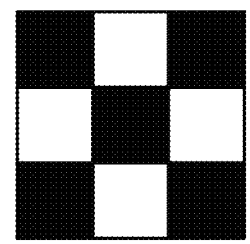
FIG. 3A is a 3×3 pixel image, prior to processing.
Figure 3B:
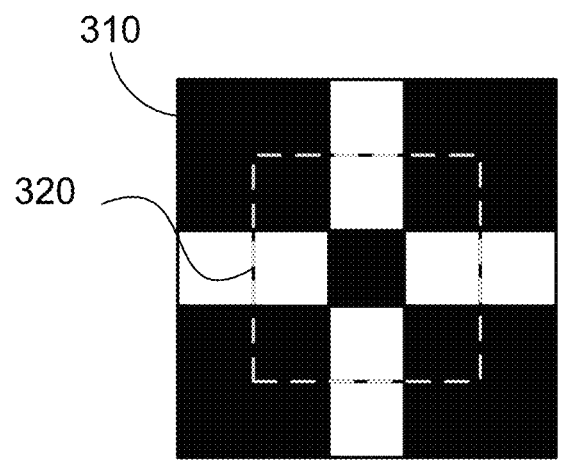
FIG. 3B is the image of FIG. 3A after image dimensions have been increased and peripheral pixels of the original image copied into the enlarged region.

FIG. 3A and FIG. 3B illustrate the effect of the two copying steps 260 and 270. FIG. 3A is a 3×3 pixel image to be upscaled by the renderer 140. When the PDL interpreter 120 builds the display list 130, during step 250 the PDL interpreter 120 allocates the buffer 1611 at least as large to hold (3+2)*(3+2) pixels of image data. The resulting buffer in the display list can store 25 pixels of image data. Generically, for an (n×m) pixel image, the buffer size is (n+2)*(m+2). For the example shown, in step 260 the image data is copied into the central portion of the buffer 1611, shown by region 320 in FIG. 3B. The image pixels along the edge of the copied image data (along the inside of perimeter 320) are then copied according to step 270 into the adjacent enlarged region, producing the enlarged image 310.

Implementation 2

Figure 4A:
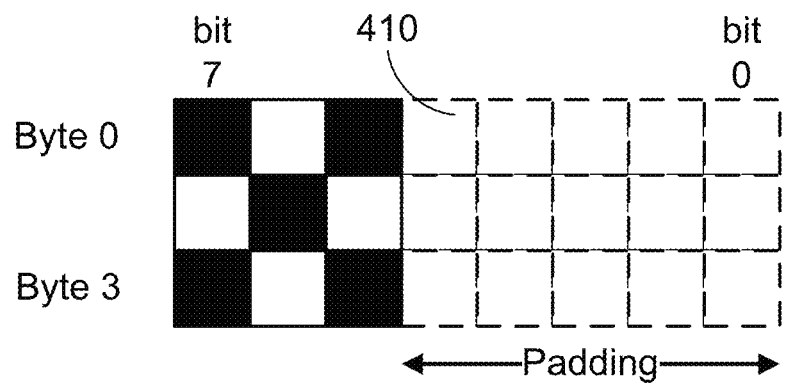
FIG. 4A shows how a 1 bit/pixel image is stored in memory.
Figure 4B:
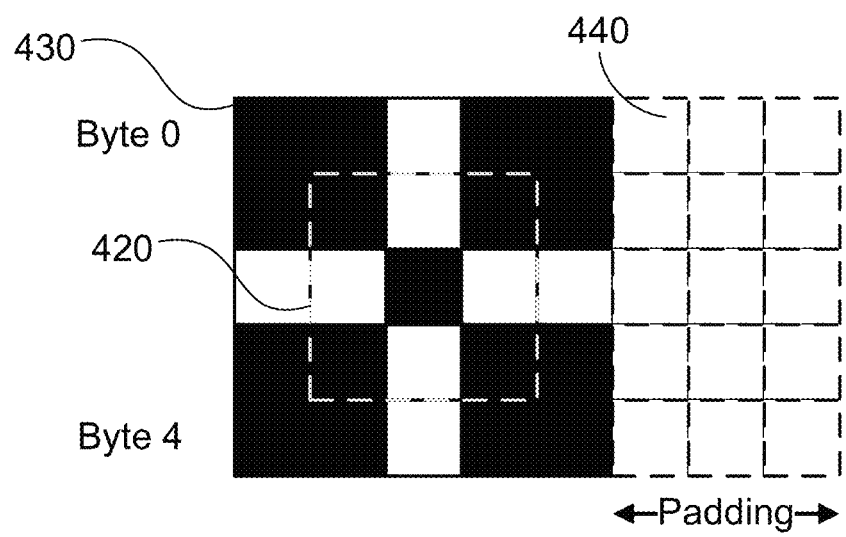
FIG. 4B is the image of FIG. 4A after image dimensions have been increased and peripheral pixels of the original image copied into the enlarged region.

It is common to pad rows of image data to make the storage of image data in memory convenient. Uncompressed image data is often padded to at least a multiple of one byte. Image data that has been compressed or decompressed using a lossy compression format may also be rounded up to a MCU multiple, such as 8 pixels used by JPEG compression. This unused memory arising from the padding or rounding operation is available to be used in the arrangements presently described, reducing the additional memory required for storing an enlarged image in the display list 130. FIG. 4A shows the image of FIG. 3A stored as a 1-bit per pixel image in the memory 1609. Each row of image data is byte aligned and as a result, there are 5 unused bits (or padding) after each row 410 of pixel data. The padding can be used to store a portion of the enlarged image region. This is illustrated by FIG. 4B where the image in FIG. 4A has been copied into a buffer 420, representative of the buffer 1611, and step 270 applied to copy pixels into the enlarged region. The image buffer 420 only needs to be enlarged to accommodate the top and bottom edges, resulting in an additional 2 bytes of memory required to store the enlarged image 430. The number of unused bits 440 has been reduced to 3 bits per row of image data.

It is common to compress images prior to storing them in a display list, the compression being performed using lossy or lossless compression techniques. Depending on the compression method used, it may be necessary to round up the image dimensions to an MCU multiple prior to compression. If this is known in advance of copying the image data into the display list buffer 1611 in steps 260, it is possible to use the resulting enlarged buffer for the purposes described. Where each image dimension can be rounded up by at least two pixels, no increase in buffer size is needed to store the enlarged image.

Figure 5A:
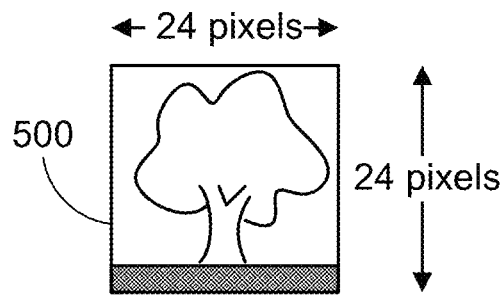
FIG. 5A shows a decompressed image.
Figure 5B:
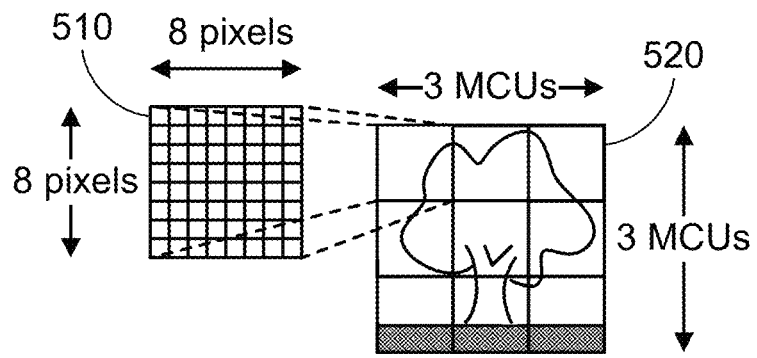
FIG. 5B shows the picture of FIG. 5A divided into Minimally Coded Units (MCUs) for the purposes of JPEG compression.

Implementation 3

Where images are contained in the PDL data in a compressed form, it can be efficient to copy the compressed data directly into the display list 130 to avoid decompression and recompression. In this case it is difficult to apply the approaches discussed so far without a decompression step. However it is possible to apply a modified approach by exploiting the tiled-nature of lossy compression formats, such as JPEG, and the ability to flip and rotate tiles (or MCUs) losslessly in the frequency domain. This approach will be illustrated using the image 500 in FIG. 5A, which is sized at 24×24 pixels. FIG. 5B shows how the image in FIG. 5A is divided into MCUs 520 for the purposes of JPEG compression/decompression. Each MCU is comprised of an 8×8 pixel tile. In the compressed version of the image, MCUs are coded using a Discrete Cosine Transform (DCT) and the corresponding coefficients quantised and then encoded using Huffman encoding, forming the Entropy Coded Segment in the JPEG bitstream. As the JPEG is copied to the buffer 1611 of the display list 130, the Huffman-encoded MCUs around the perimeter of the image are duplicated in the manner described with reference to FIGS. 6A to 6C.

Figure 6A:
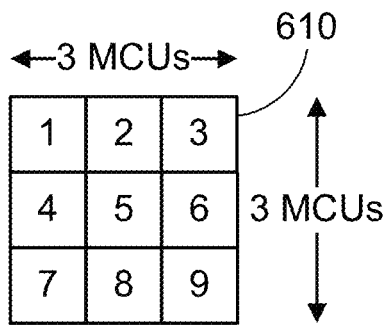
FIG. 6A allocates indices to the MCUs of the image shown in FIG. 5B.
Figure 6B:
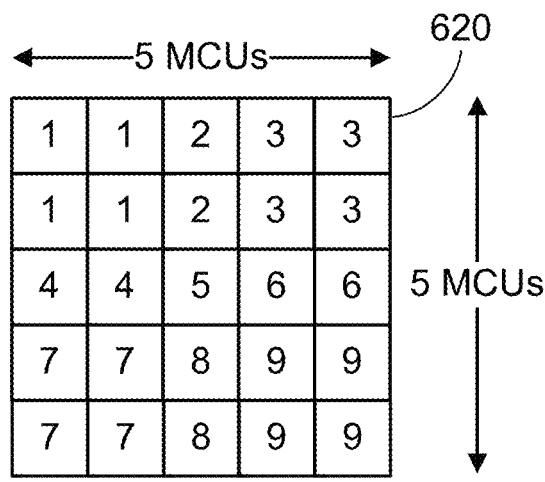
FIG. 6B shows how the entropy coded data is copied into the enlarged region.
Figure 6C:
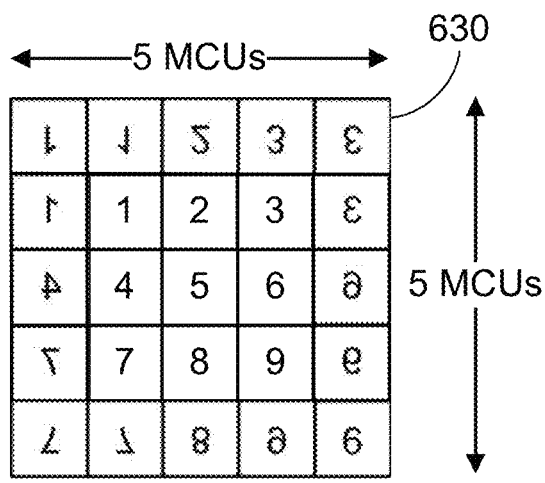
FIG. 6C shows the flipping of the entropy coded data in the enlarged region.

FIG. 6A depicts the assigning of indices to each MCU 610 used to store the compressed version of the image in FIG. 5A. FIG. 6B shows how the entropy-coded MCUs 620 are copied into the buffer 1611 in the display list 130, duplicating the MCUs around the perimeter of the image. At this stage, the MCUs in the outer ring of the image are flipped by decoding the Huffman encoded DCT coefficients and remapping the coefficients such that each is flipped about the edge of the image. This is best shown in FIG. 6C by the flipping of the MCU indices 630. The flipping is equivalent to rotating those MCUs by through 180 degrees. The process of remapping DCT coefficients is not discussed here as it is widely documented and commonly used in image manipulation software. The coefficients are then Huffman encoded and written back to the buffer 1611 in the display list 130. The resulting compressed JPEG is later decompressed by the renderer 140.

The implementation of FIGS. 5A to 6C follows the process of FIG. 2 as explained in the first implementation with the exception that memory buffer determination step 240 enlarges the image by 1 MCU (8 pixels) around the perimeter of the image which must be accommodated by in the image transform adjustment step 220. Image copying step 260 copies the entropy-coded MCU data into the buffer 1611 and step 270 copies the MCUs around the edge of the image into the enlarged region, after which the copied MCUs are flipped and rotated by reordering DCT coefficients.

Figure 5C:
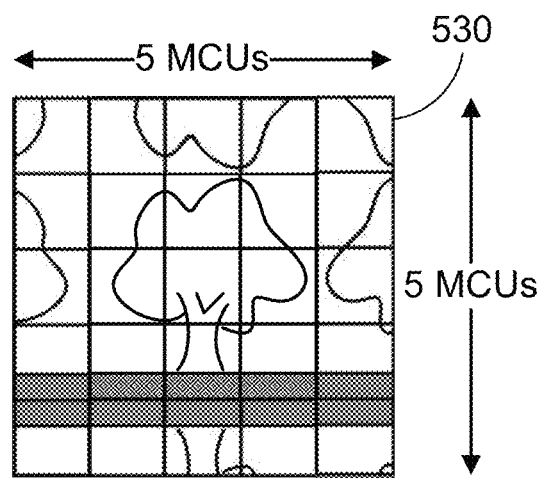
FIG. 5C shows the result of manipulating the JPEG entropy coded stream to duplicate pixels around the perimeter of the image.

Applying the algorithm to FIG. 5A, and decompressing the resulting compressed image, produces the image shown in FIG. 5C. Note the flipped MCUs around the edges 530. The resulting image duplicates the pixels around the edge of the original image and the remaining image data in the duplicated MCUs is clipped out by the renderer 140.

Implementation 4

Figure 7:
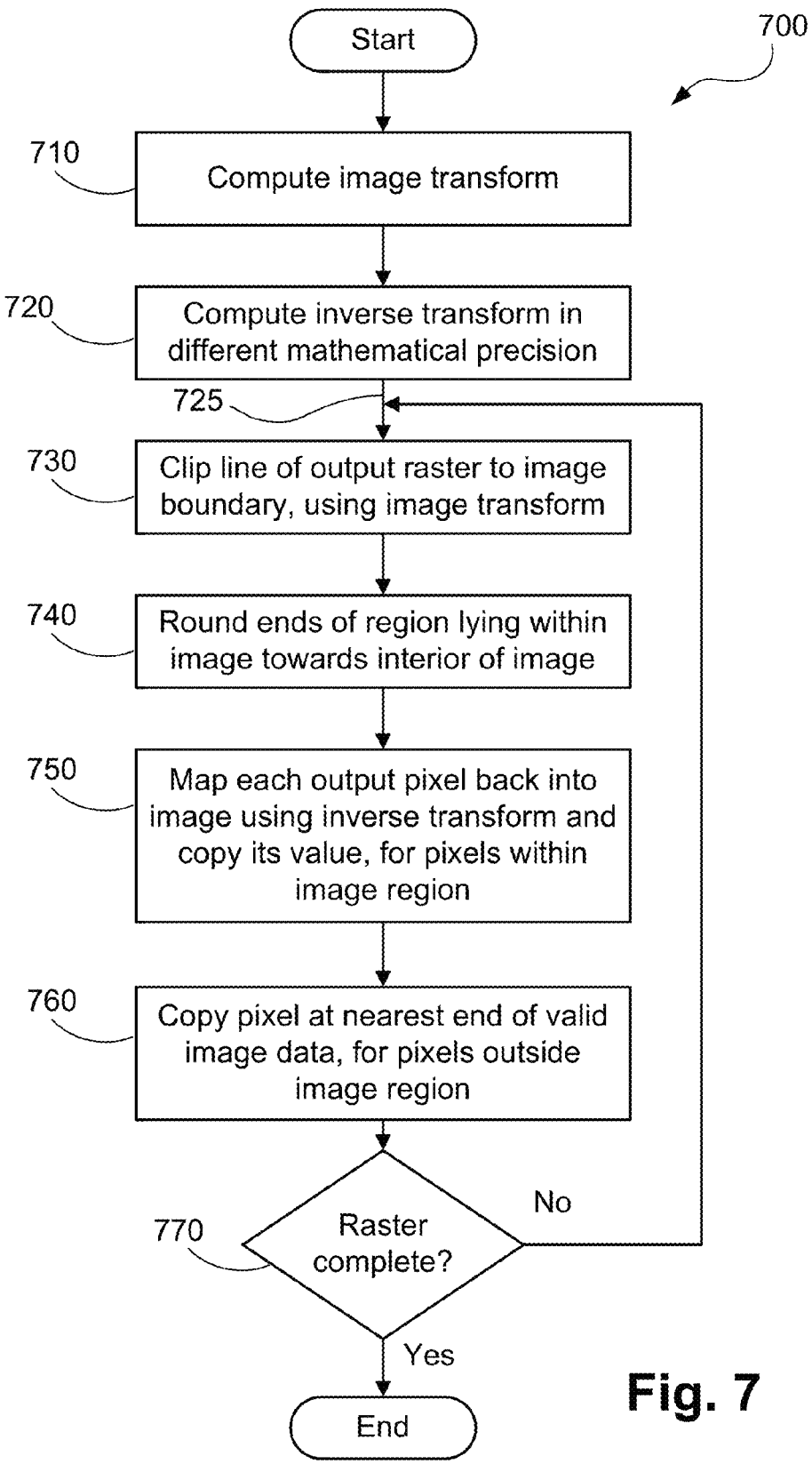
FIG. 7 is a flowchart of another method for transforming an image for printing.
Figure 8A:
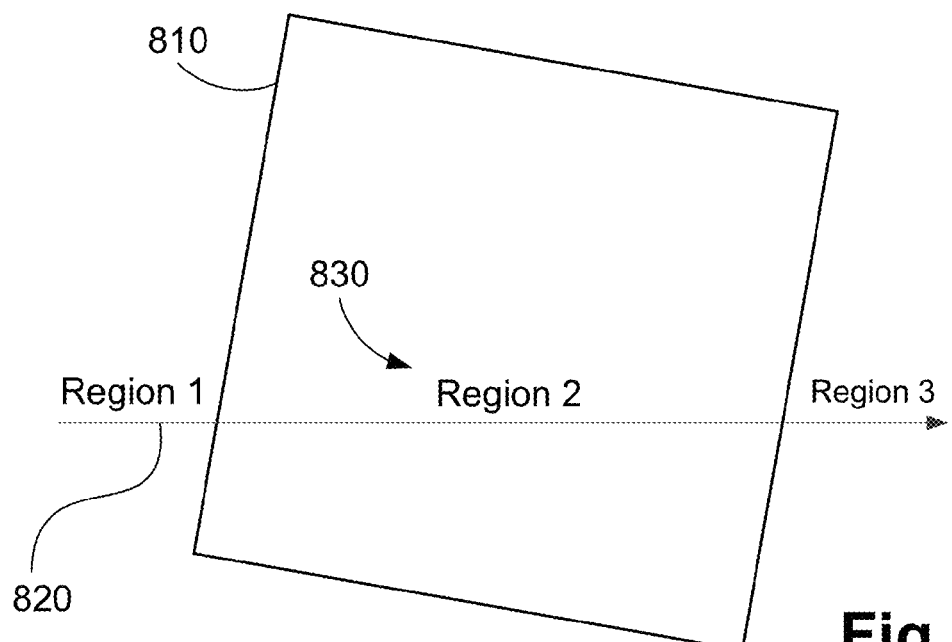
FIGS. 8A and 8B show a line of the output raster, intersecting the source image, and broken into regions by clipping, according to a further implementation.
Figure 8B:
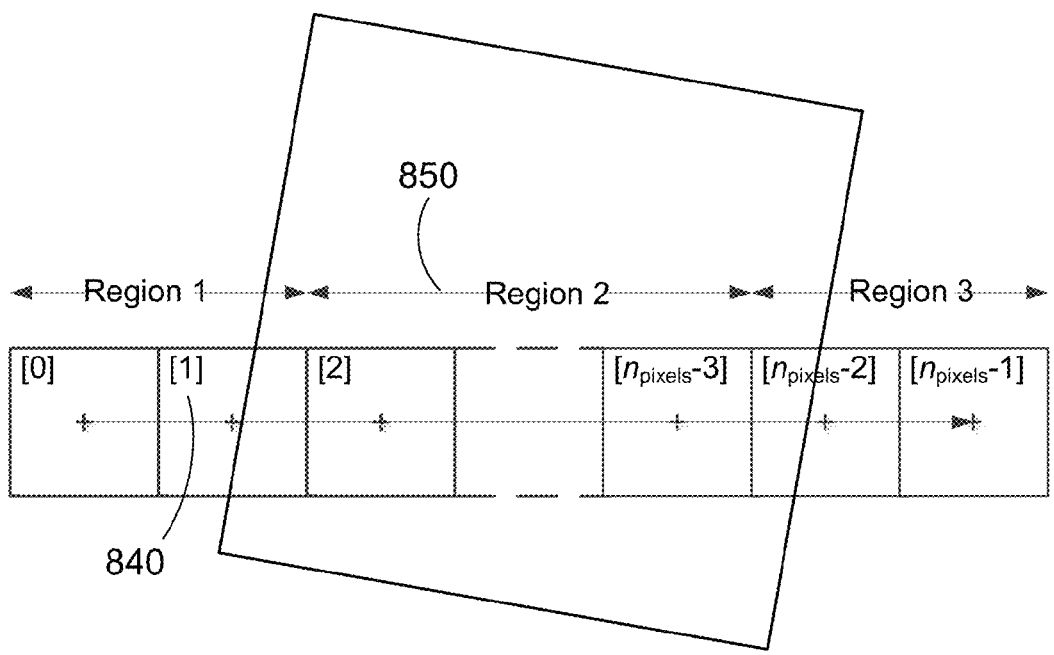

This implementation follows a method 700 seen in FIG. 7 and which is illustrated by FIGS. 8A and 8B and is applicable when floating point capability is available to the renderer 140. The method 700 however uses fewer floating-point operations than prior art methods. In the method 700, the affine transform is received at step 710 and inverted at step 720 so as to produce an inverse transform 725 in fixed point, in the same manner as for Implementation 1. The output raster is of width $n_{pixels}$ and is constructed one line at a time. For each such line, such as the line 820 in FIG. 8A, the portion lying within the source image is determined with floating-point precision at step 730, by clipping the line 820 to an image rectangle 810 of the source image in raster coordinate space, using a Liang-Barsky algorithm or other line clipping method known in the art. This generally divides the output line into three regions 830, the second of which (Region 2) lies within the input image 810. Note that depending on the layout of the image and the output raster, one or more of the regions may be absent. For the purpose of this description, we assume they are all present, and refer to the region lying within the image as Region 2, and those outside as Regions 1 and 3. Next the boundaries of Region 2 are converted to integer pixel positions 840 (as identified in square brackets in FIG. 8B) at step 740, ensuring that any rounding is toward the interior of the image. This ensures that every pixel of Region 2 corresponds to valid image data, and hence may be copied at step 750 without any clamping step, simply by using the inverse transform to access image data. For example, in FIG. 8A, in which pixels from image 810 are to be rendered on a portion of the output raster line in FIG. 8B comprising pixels 0 to ($n_{pixels}$−1). Pixels 2 to ($n_{pixels}$−3) of Region 2 850, may be so mapped and copied. The pixels of Regions 1 and 3 derive their data from the image pixel at the nearest end of Region 2 at step 760. In FIG. 8B, this applies to pixels 0 and 1, and also to pixels ($n_{pixels}$−2) and ($n_{pixels}$−1). Steps 730 through 760 are repeated for each line of the output raster according to step 770.

Whilst the above implementations refer to upscaled images, they also apply to images that are rotated or otherwise geometrically transformed. Other geometrical transformations including shearing and downscaling. As such the type of transform is not specific.

Implementation 5

Modern print forming apparatuses are designed to handle data in various page description languages (PDLs). PDL data is made up of drawing instructions that place graphical objects such as images, text and line art on a page. A typical method of supporting multiple PDLs is to create a renderer that supports a single, intermediate PDL and create an interpreter for each supported PDL. The interpreter reads the particular PDL data and produces equivalent intermediate PDL data. The intermediate PDL data for a page is called a display list. The renderer processes the display list to produce an output image that can be used by print forming hardware to create an impression on a substrate.

A single image may be used in many different drawing commands made within a single page. Image data can be large and storage available for the display list very limited, therefore it is advantageous to store each unique image only once in the display list and have different drawing commands reference the same image data.

To achieve this, an image cache is used. An image cache is a key/value store maintained by the interpreter. The key is either a unique identifier (UID) for the image provided by the PDL data or computed from the image data. The value associated with the key is a reference to the image data in the display list. Different images must have different keys.

When an interpreter processes a drawing instruction that places an image, the image cache is queried to determine if that image data is already present in the display list. If the image is already present, a reference to the image data is retrieved from the cache and is used in the drawing instruction. Otherwise, the image data is added to the display list, and the image cache is updated with this new key/value pair. A reference to the newly added image data is then used in the drawing instruction.

A drawing instruction that places an image on a page will specify the location for the image on the page. For example, a drawing instruction will specify where the top-left corner of the image will be placed. A drawing instruction also specifies the image output area—the width and height of the area on the page the image will cover. When the image width and height does not match the output width and height, the image must be scaled. Scaling is normally done in the renderer. There are many methods of scaling. Notable examples are nearest neighbour and bilinear interpolation. Scaling an image is a type of sampling. When the width and height of the image is increased (scaled-up) the image is sampled at a higher frequency.

A drawing instruction may place an image with sub-pixel precision in the output image. Images are made of discrete pixels, so an image pixel value cannot be placed directly at a non-integer location in the output image. To have the effect of placing an image at a sub-pixel location, the output sample points are calculated with sub-pixel precision. These sample points are shifted according to the sub-pixel offset, and then used to sample the image. In the example of nearest neighbour sampling, the sub-pixel offset can change which image pixel at sample point lies nearest to. The use of sub-pixel image placement improves output image quality.

The convention used here is that output pixel samples occur at an offset of 0.5 from the pixel index. The pixel at index (0, 0) covers the area (0.0, 0.0) to (1.0, 1.0) and is sampled at (0.5, 0.5). The sub-pixel placement specified in a drawing instruction is a pair of values in the range −0.5 to 0.5, one value for the horizontal offset and the other for the vertical offset. A sub-pixel placement of zero indicates the sample should be taken from the centre of the pixel. The magnitude of a sub-pixel offset is never larger than 0.5 because a sub-pixel offset larger than 0.5 that moves the sample into the adjacent pixel.

Some renderers only support placement of images at integer pixel locations and/or only support scaling of images with an integer scale factor. This may be because the renderer was not designed for high quality output or because the designer wished to avoid floating point math operations. These renderers can still produce high quality output but images must be scaled to integer scaling and sampled with sub-pixel offset before being added to the display list. This operation is referred to as resampling.

The effect of resampling is that a single image, reused multiple times with different scaling factors and sub-pixel offsets will produce many different resampled images. These resampled images are added to the display list. They should also be added to an image cache. Typically the resampled images are kept in a separate image cache to the non-resampled images. A single input image reused with different sub-pixel offsets and scales will result in many different images in the resampled image cache, so the UID or hash of the input image is not enough to uniquely identify each resampled image and a different method of key generation must be used.

A first approach to key generation is to hash the data of the resampled image to generate a key. While this approach will minimise the size of the display list, it is very computationally expensive since it requires resampling and hashing for every use of an image that requires resampling.

A second approach to key generation for resampled images is to use the scale factor and sub-pixel offset along with the original image's key to create a new key. This approach has very little computational cost but it has the problem that when using nearest-neighbour sampling, a single image reused with a scale and sub-pixel offset slightly different to a previous scale and/or sub-pixel offset will often result in the same resampled image. However, the cache keys will be different and the resampled image data will be duplicated in the display list. This problem can be reduced by quantising the sub-pixel offsets. Many slightly different sub-pixel offsets will be quantised to the same value. A small number of quantisation levels does reduce the number of resampled images however it also reduces output quality. Keeping enough quantisation levels to maintain good output quality tends to result in duplicate resampled images. It is desired to reduce the number of duplicate resampled images, while maintaining image quality.

The solution is that for some scaling factors and sub-pixel offsets, there are methods of calculating an identifier that are computationally inexpensive and have the property that when a single image is resampled with different sub-pixel offsets and scaling factors, some sub-pixel offsets and scaling factors which result in the same resampled image also result in the in the same identifier. This identifier can be combined with the original image key to generate an image cache key for the resampled image, in a method similar to the second approach to key generation described in the background. This innovation reduces the problem of duplicate resampled images present in the second approach described in the background, while being computationally cheaper than the first approach described in the background.

This innovation applies in a print forming apparatus with interpreter and renderer components, where images are resampled before being added to the display list. The images are resampled to remove sub-pixel offset and/or arbitrary scaling responsibility from the renderer. In this system a resampled image cache is used to minimise the resampled image data added to the display list.

Figure 9:
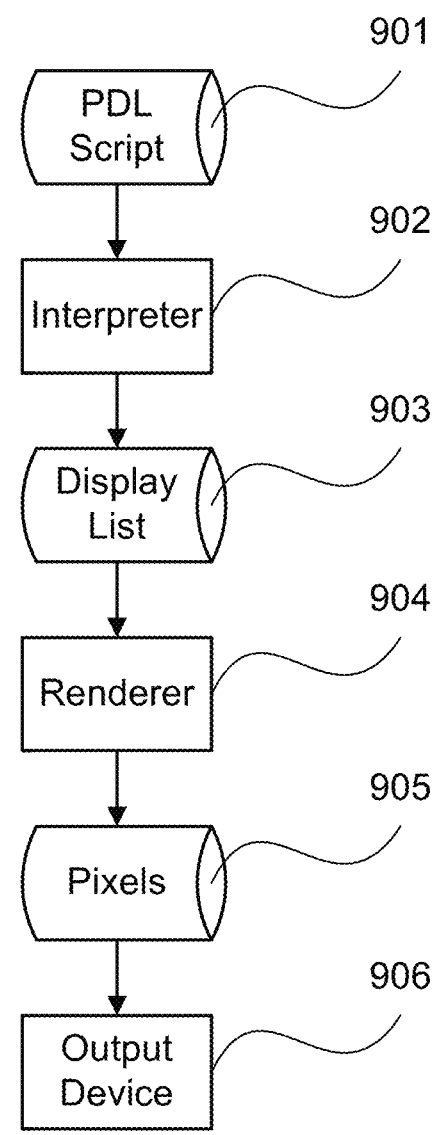
FIG. 9 is a block diagram of a data processing architecture for the disclosed arrangements.

FIG. 9 shows the components in a print forming apparatus. A PDL script containing drawing instructions of a particular PDL 901 is read by an interpreter 902, which produces equivalent drawing instructions in another PDL called the display list 903. The display list is input into the renderer 904. The renderer processes the display list, producing pixels 905 that can be input into an output device 906 to create an impression on a substrate.

Figure 10:
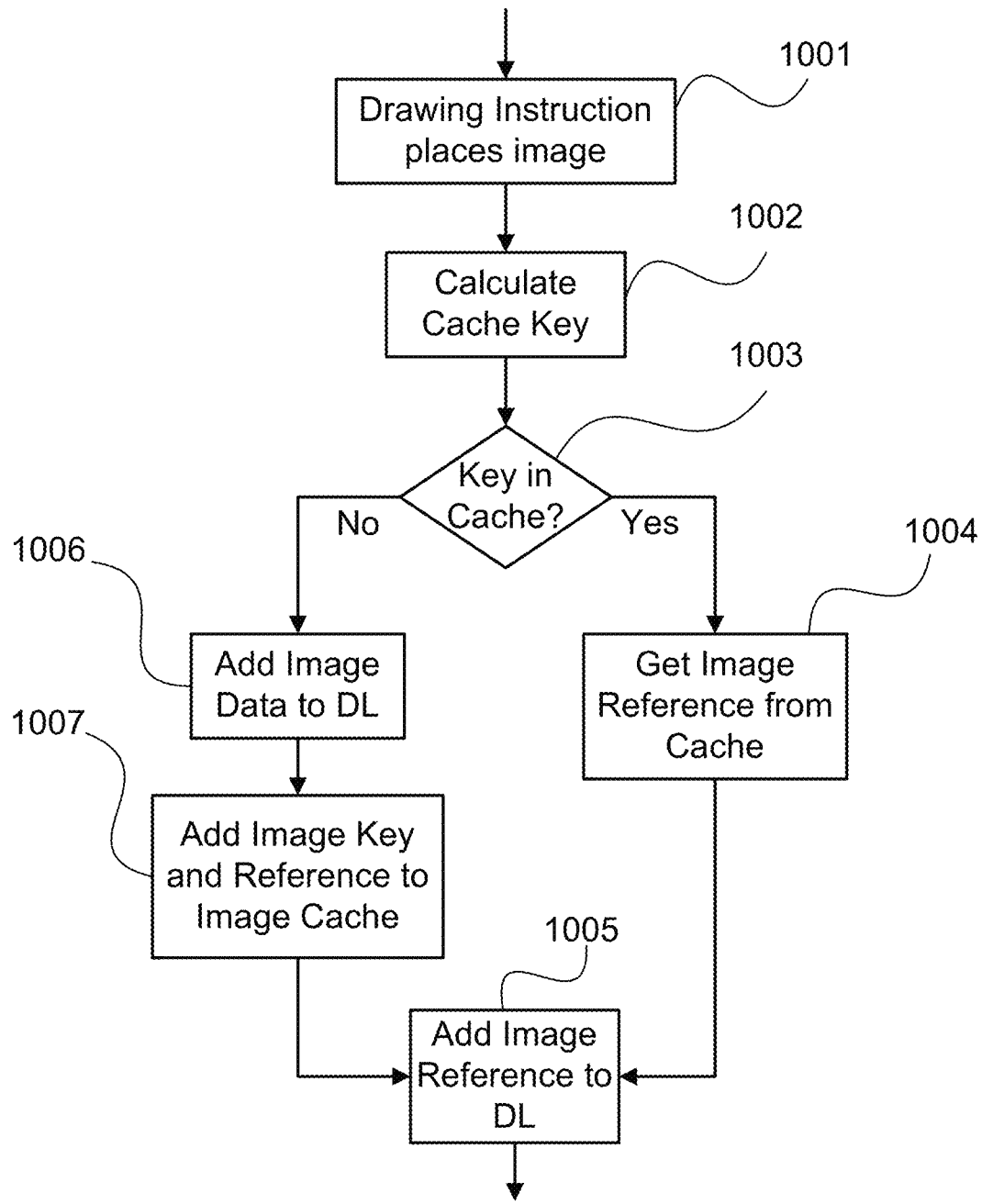
FIG. 10 is a block diagram illustrating the process of image caching.

FIG. 10 shows the process of image caching implemented inside the interpreter 902. When the interpreter is interpreting PDL data, a PDL drawing instruction places an image 1001. The interpreter calculates a cache key for that image 1002. If the key is in the image cache 1003, a reference to the image data is retrieved from the cache 1004 and added to the display list 1005. If the key is not found, the image data is added to the display list 1006 and the key and reference are added to the image cache 1007. The image reference is then added to the display list 1005.

Figure 11:
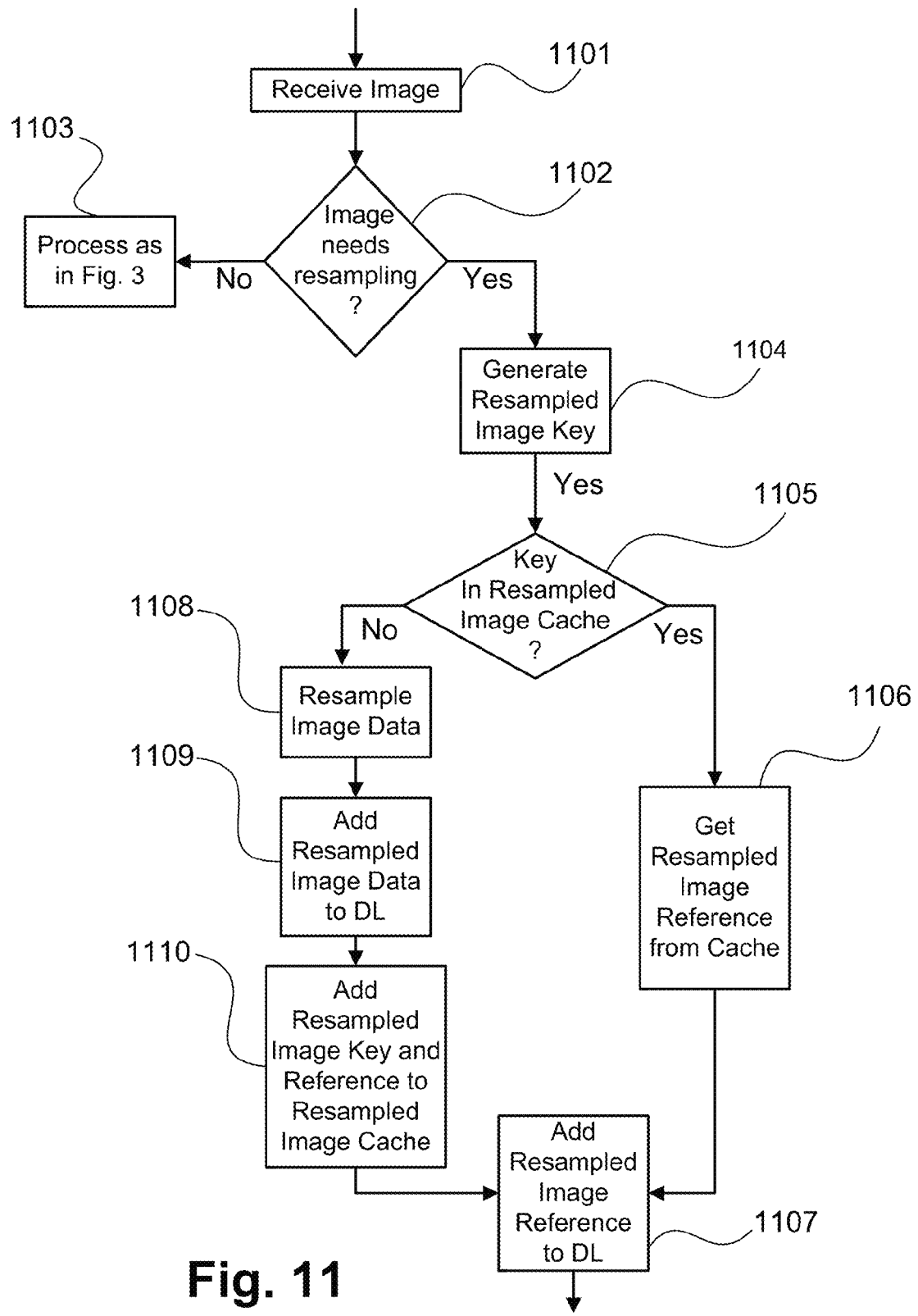
FIG. 11 is a block diagram illustrating the process of caching resampled images.

FIG. 11 shows the addition steps preformed in a system that uses a resampled image cache. When a drawing instruction places and image 1101, the interpreter checks if the image requires resampling 1102. If not, the image is processed according to FIG. 10, 1103. If the image requires resampling, then a resampled image cache key is generated for the resampled image 1104. If the key is in the cache 1105, a reference to the resampled image is retrieved from the resampled image cache 1106 and added to the display list 1107. If the key is not in the resampled image cache, the image is resampled 1108 and the resampled image is added to the display list 1109 and the resampled image key and reference are added to the resampled image cache 1110. The resampled image reference is then added to the display list in step 1107.

The our method is the use of an image cache key generation method that can produce the same key value when an image resampled with different sub-pixel offsets and/or scaling factor results in an identical resampled image. The key generation method also has the property that it is less computationally expensive than resampling and hashing every sub-pixel offset and scaling factor combination.

In one approach, the key generation method of step 1104 uses the scale directly in the image cache key, and an identifier is calculated from the sub-pixel offset and scale. This identifier is also included in the key. This method can be used when the sub-pixel offset is quantised and resampling is done using the nearest-neighbour method.

The identifier I is made up of two identifiers $I_x$ and $I_y$. The sub-pixel offset of the image in horizontal and vertical directions will be referred to by $P_x$ and $P_y$. The width and height of the image in pixels is $W_i$ and $H_i$ and the width and height of the area that the image covers in the output in pixels is $W_o$ and $H_o$. The image scale factor is referred to by $S_x$ and $S_y$ where $S_x = W_o/W_i$ and $S_y = H_o/H_i$. The identifier I is then calculated in the following manner, where subscript d refers to the horizontal dimension "x" or vertical dimension y, and input image width $W_i$ is referred to as $N_x$ and input image height $H_i$ is referred to as $N_y$:

$$I_d = \min(\text{floor}((0.5+P_d)/(S_d-1)), N_d) \text{ when } S_d > 1$$

$$I_d = \min(\text{floor}((0.5-P_d)/(1-S_d)), N_d) \text{ when } S_d < 1$$

This method can only be applied when the following conditions hold:

$$N_d * (S_d - 1) < 1 \text{ when } S_d > 1$$

$$N_d * (1 - S_d) < 1 \text{ when } S_d < 1$$

These conditions are true for images with small width and height and scale near one and this method can only be applied to images with horizontal or vertical alignment (that is, they have 0, 90, 180 or 270 degree rotation). Images which do not meet these conditions can use one of the key generation methods described in the background.

Figure 13:
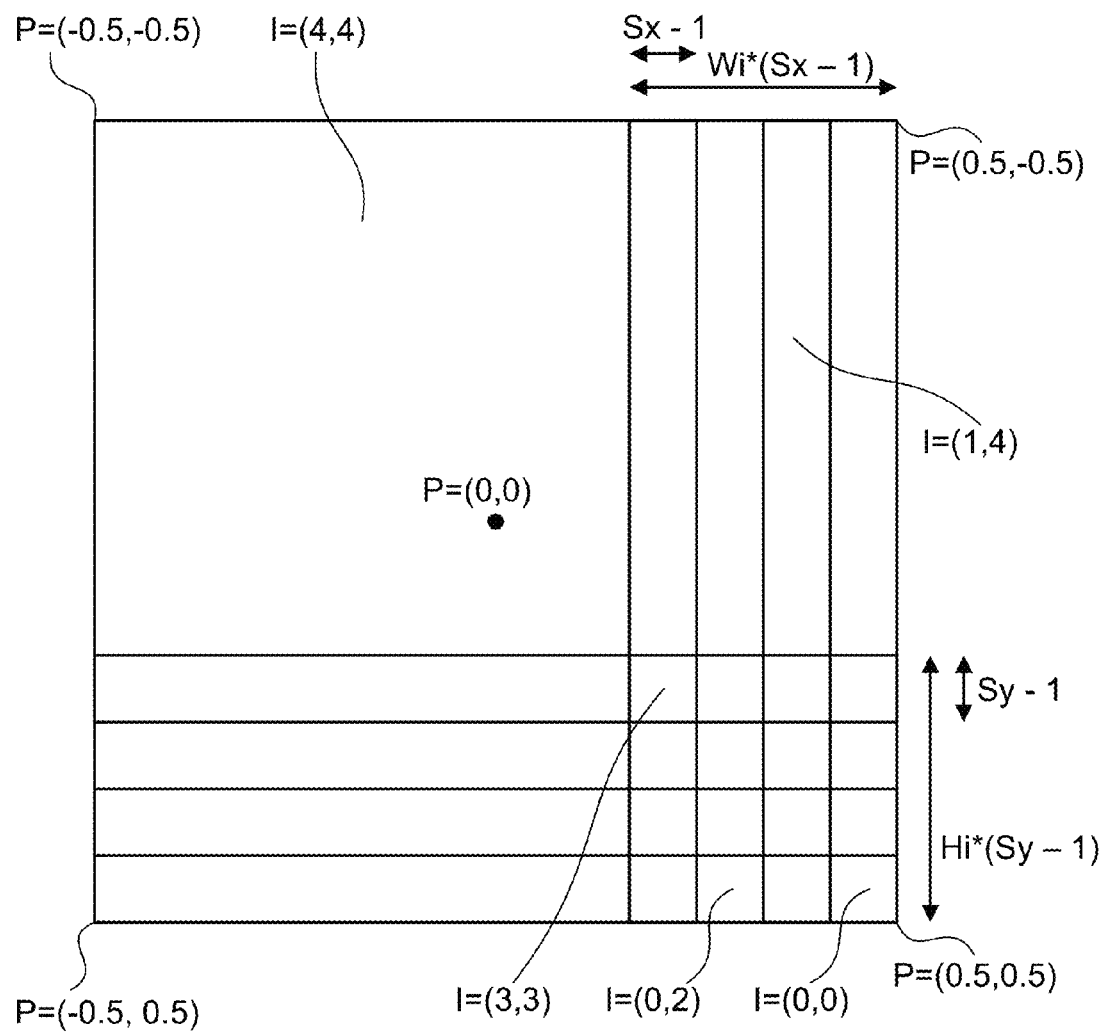
FIG. 13 is a diagram illustrating the process of looking up sub-pixel offsets.

FIG. 13 shows the possible identifiers generated by an image with input width and height 4 and a scale of 1.0833. The outer square has a width and height of 1.0 and is divided into regions, where each region defines all of the sub-pixel offsets that result in the same resampled image data. In the horizontal direction, starting from the right hand side, the square is cut $W_i$ times in areas of width $S_x - 1$. In the vertical direction, starting from the bottom, the square is cut $H_i$ times in areas of height $S_y - 1$. This results in $(W_i+1)*(H_i+1)$ regions.

In FIG. 13, a sub-pixel offset is a point within the square (denoted by P), and the index of the region it lands within is the identifier (denoted by I). Region indexes start from zero at the bottom right. For example P=(0.5,0.) is in region I=(0,0) and P=(0,0) is in region I=(4,4). Note the region corresponding to I=(4,4) is large and many different sub-pixel offsets will result in this identifier.

The number of bits needed to store the identifier is related to the input image width and height. The largest identifier in $I_x$ is $W_i$ and the largest $I_y$ is $H_i$. An implementation must choose a maximum number of bits for the identifier and images that exceed this size must use another method of key generation.

This key generation method has the problem that images with different scales that result in the same resampled image will still be duplicated in the display list, because the scale is used directly in the key. Fortunately, it is more common for an image to be reused many times with the same scale but with slightly different sub-pixel offsets, for example when an image is used in a tiled pattern.

In another approach, a lookup table is created for each unique input image size and output image size combination. The collection of lookup tables is stored in the interpreter in a structure called the region array store. When the interpreter needs to generate a resampled image cache key (1104 of FIG. 11) the interpreter locates or creates the lookup table that corresponds to the drawing instructions input size output size combination. The drawing instruction's sub-pixel placement is quantised and used to lookup the table. The result of the lookup is another sub-pixel placement that has the same resampled image.

Figure 12:
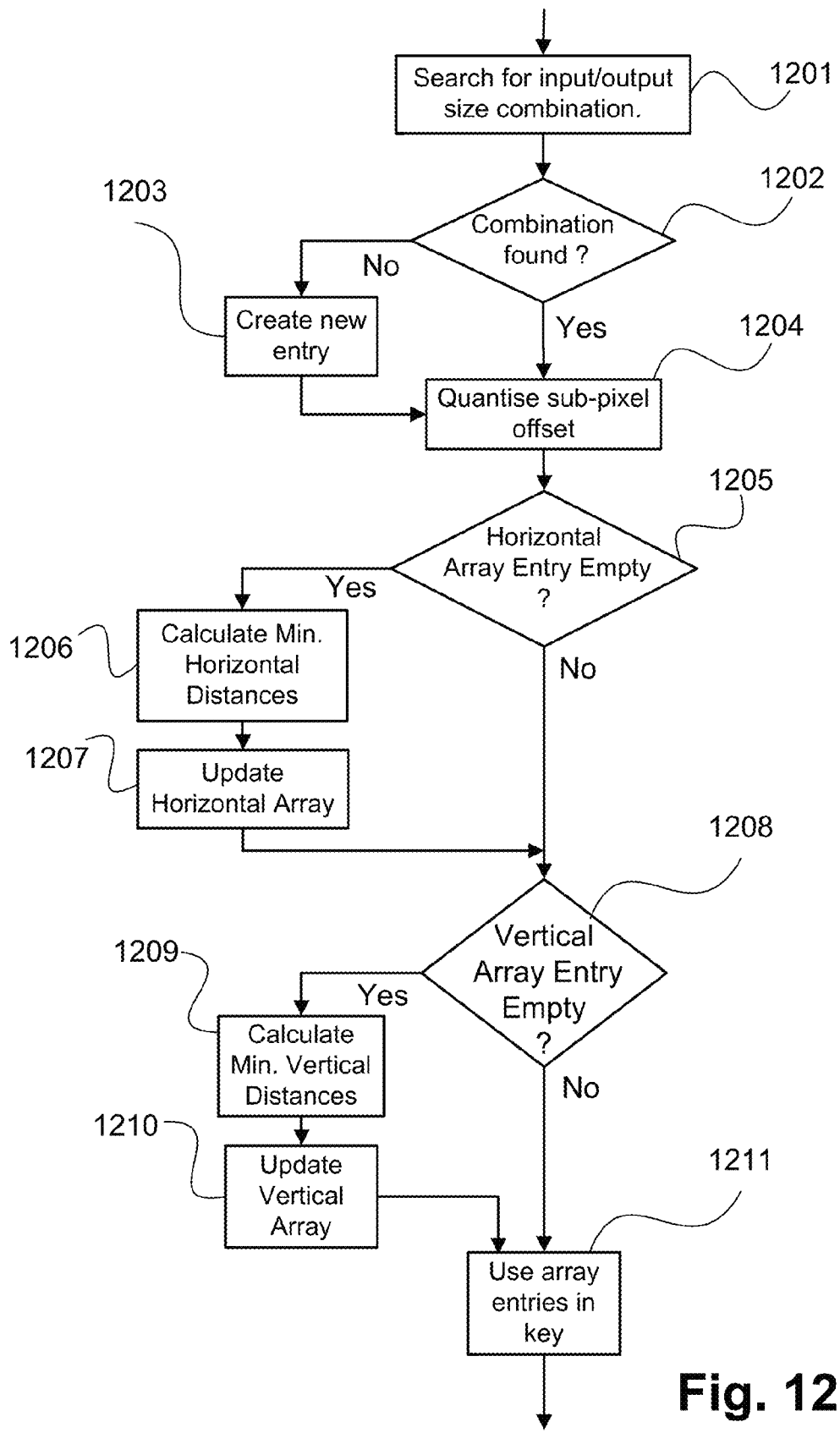
FIG. 12 is a diagram illustrating how sub-pixel offsets are mapped to identifiers.

FIG. 12 describes the steps taken in this implementation during resampled image key generation.

Initially, before any drawing instructions are processed, the region array store is empty. When a resampled image cache key is to be generated, the region array store is searched for the image input size/output size combination specified in the drawing instruction in step 1201. If the combination is not found in step 1202 an empty table is created in step 1203 and added to the region array store. The region array store may itself use a fast lookup structure such as a tree or skip-list to quickly find the correct lookup table for a given image input size/image output size combination.

Figure 14:
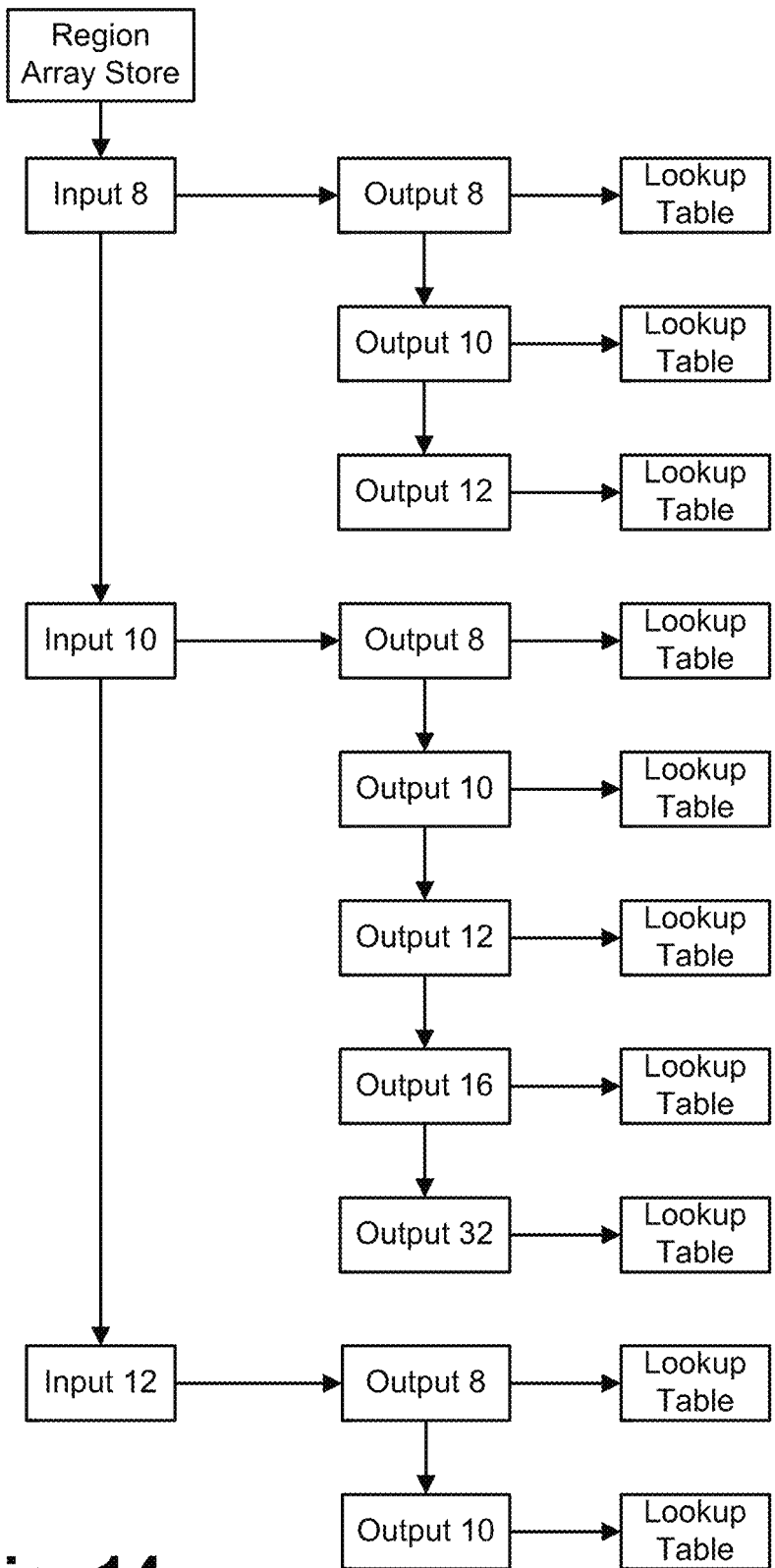
FIG. 14 is an example structure of a region array store as described in the process of FIG. 13.
Figure 15A:
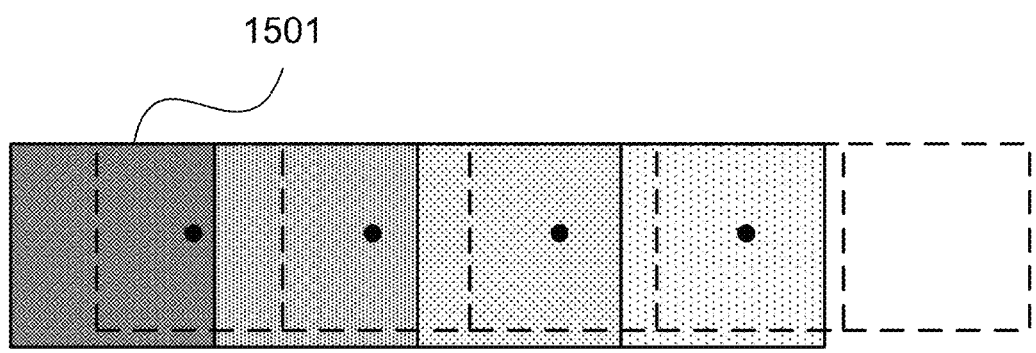
FIGS. 15A to 15D show image pixels boundaries overlaid on output pixels with scale factor and output area according to an example.
Figure 15B:
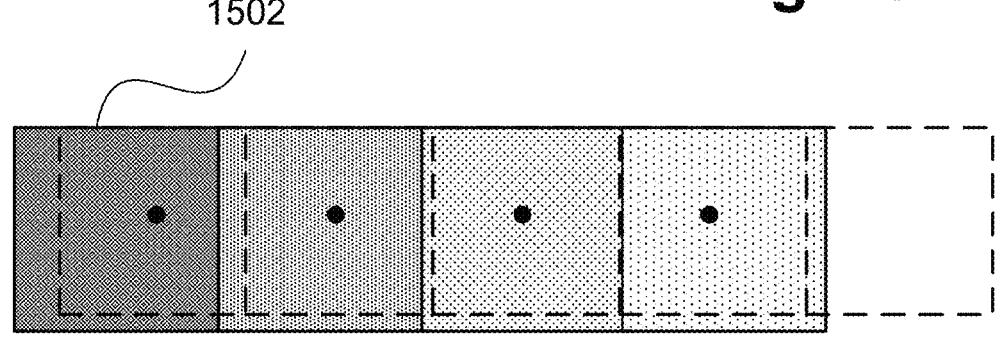
Figure 15C:
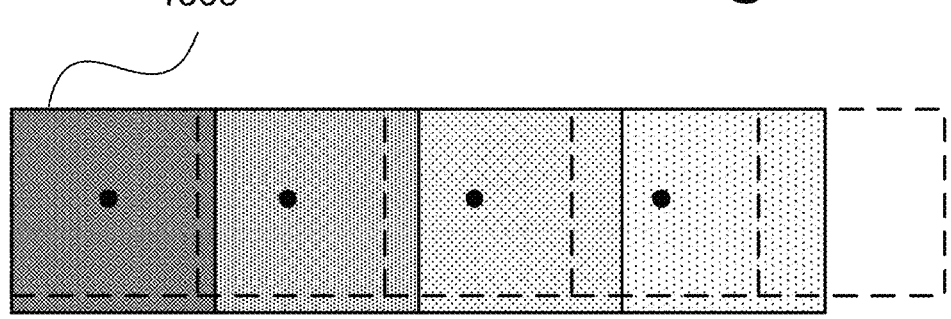
Figure 15D:
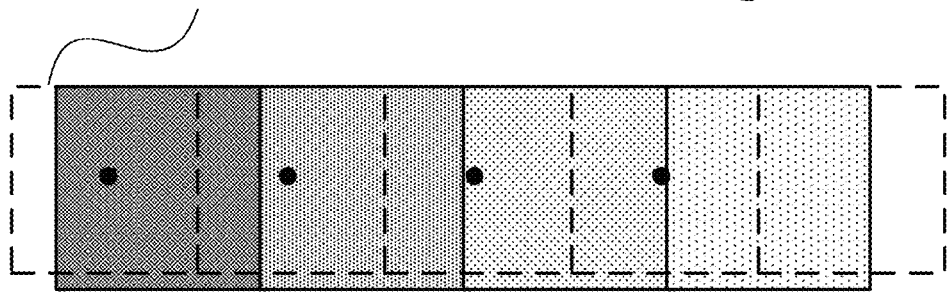

FIG. 14 shows an example region array store. In this example, the region array store has a sorted list of input image sizes. Each entry in this list points to a sorted list of output image sizes. Each of these output sizes points to a lookup table. The correct table would be found first by finding the matching input size, and then matching output size.

Once the correct lookup table has been found or created, the sub-pixel offset specified by the drawing instruction is quantised and converted to a positive integer at step 1204, via the method floor((P+0.5)*Q) where P is the sub-pixel offset in one dimension, and Q is the number of quantisation levels.

Each lookup table consists of two arrays, one array is indexed by quantized horizontal sub-pixel offset and the other is indexed by quantized vertical sub-pixel offset. Each array has Q entries. The array entries may be empty or contain a sub-pixel offset that will produce the same image sample points when nearest-neighbour sampling is used.

In FIG. 12, the quantized horizontal sub-pixel offset is used to index the horizontal array. If the entry at that index is determined to be empty in step 1205 additional steps must be taken to enter valid entries into the array in steps 1206 and 1207.

Array entries are added by first performing operation similar to sampling, referred to as the minimum distance calculation. This operation produces the minimum distance between any sample point and the image pixel boundaries in one dimension. In the horizontal dimension it produces the nearest left and right boundaries. In the vertical direction it produces the nearest upper, lower pixel boundaries.

An example implementation of the minimum distance calculation is given below. The parameters have the following meaning: samples is the width or height in pixels of the area in the output covered by the image. scale is the ratio of output image width or height over input image width or height. For example, an 8 pixel wide image that covers a 16 pixel wide region in the output would have scale. sub_pixel_offset is a value in the range −0.5 to 0.5.

```
0 :       def min_distance_calc(samples, scale, sub_pixel_offset):
1 :           min_left_dist = 1.0
2 :           min_right_dist = 1.0
3 :           n = 0
4 :           while n < samples:
5 :               output_sample_point = n + 0.5
6 :               image_sample_point = (output_sample_point − sub_pixel_offset)/scale
7 :
8 :               left_dist = scale * (image_sample_point − floor(image_sample_point))
9 :               if left_dist < min_left_dist:
10 :                  min_left_dist = left_dist
11 :
12 :              right_dist = scale * (ceil(image_sample_point) − image_sample_point)
13 :              if right_dist < min_right_dist:
14 :                  min_right_dist = right_dist
15 :
16 :              n += 1
17 :          return (min_left_dist, min_right_dist)
```

The minimum distances indicate how much sub-pixel shift can be applied to the resampled image before a sample point crosses a pixel boundary and the resampled image changes. The minimum distances are calculated in step 1206 and then used to update the array entries on either side of the specified sub-pixel offset that correspond to a sub-pixel shift less than the minimum distance in that direction are also set to the specified sub-pixel offset in step 1207.

An example implementation of array filling is given below. The parameters have the following meaning: Td is the horizontal or vertical array that will be updated. Nd is the number of output samples ($W_o$ or $H_o$). Sd and Pd are the scale and sub-pixel offset in a single dimension. Q is the number of quantisation levels. The minimum distance calculation defined earlier is used.

```
0 :       def set_table_entries(Td, Nd, Sd, Pd, Q):
1 :           min_left_out, min_right_out =
              min_distance_calc(Nd, Sd, Pd)
2 :
3 :           quant_size = 1.0/Q
4 :
5 :           Id = int(floor((Pd+0.5)*Q))
6 :
7 :           m = 0
8 :           while m * quant_size <= min_left_out and Id + m < Q:
9 :               if Td[Id + m] is None:
10 :                  Td[Id + m] = Id
11 :              m += 1
12 :
13 :          m = 0
14 :          while m * quant_size <= min_right_out and Id − m >= 0:
15 :              if Td[Id − m] is None:
16 :                  Td[Id − m] = Id
17 :              m += 1
```

After the horizontal array entry has been checked and possibly updated, the same process is done again for the vertical array in steps 1208, 1209 and 1210.

After both the horizontal and vertical arrays have been checked and possibly updated, the sub-pixel offsets to be used in the cache can be fetched from the lookup table and used in the resampled image cache key in step 1211.

Similar to the approach above, this key generation method has the problem that images with different scales that result in the same resampled image will be duplicated in the display list.

EXAMPLE

The following is an example of the application of the first and second approaches to an image with scale factor 1.1 and output area 4 and the sub-pixel offset quantised to 2 bits, so there are 4 possible sub-pixel offsets. The example is done in only a single dimension. An image has both horizontal and vertical dimensions but the methods are the same in each.

Following the convention used earlier, pixel centres occur at 0.5 meaning the output sample points occur at 0.5, 1.5, 2.5 and 3.5. The following table shows the corresponding image sample points for each of the 4 possible sub-pixel offsets. The image sample points are calculated using (I+0.5−P)/S. Where I is the sample number (0, 1, 2, 3). P is the sub-pixel offset and S is the scale factor.

| Sub-pixel | Sample 0 | Sample 1 | Sample 2 | Sample 3 |
|---|---|---|---|---|
| −0.5 | 0.909 | 1.818 | 2.727 | 3.636 |
| −0.25 | 0.682 | 1.591 | 2.5 | 3.409 |
| 0 | 0.455 | 1.364 | 2.273 | 3.182 |
| 0.25 | 0.227 | 1.136 | 2.045 | 2.955 |

FIG. 15 shows the boundaries of the output pixels (dashed lines), overlaid with the boundaries of the image pixels (solid lines). The black dots indicate the sample point, which occurs in the middle of the output pixel. The sub-pixel offsets −0.5, −0.25, 0 and 0.25 are shown in 1501, 1502, 1503 and 1504 respectively. A different fill is given to each image pixel. It can be seen that sample points in 1501, 1502 and 1503 land in the same image pixels, producing the same resampled image.

The index of the image pixel to be used in the output is found by taking the floor of the image sample point value, so in this case there are 2 unique resampled images.

| Sub-pixel offset | Index 0 | Index 1 | Index 2 | Index 3 |
|---|---|---|---|---|
| −0.5 | 0 | 1 | 2 | 3 |
| −0.25 | 0 | 1 | 2 | 3 |
| 0 | 0 | 1 | 2 | 3 |
| 0.25 | 0 | 1 | 2 | 2 |

The first approach can be used in this case because the condition $$Nd*(Sd-1)=4*(1.1-1)=0.4$$

is less than 1. Applying the first approach produces the following identifiers for each sub-pixel offset.

| Sub-pixel offset | Identifier |
|---|---|
| −0.5 | 4 |
| −0.25 | 4 |
| 0 | 4 |
| 0.25 | 2 |

In applying the second approach, the lookup table will contain a single array with four entries corresponding to the four quantisation levels. The lookup table initially contains all "None" entries.

Each sub-pixel offset quantisation level shifts the image 0.25 in the output space. Looking at the image sample points for sub-pixel offset −0.5 1501, the sample nearest a left image boundary is sample 3 with a distance of 0.636. The sample nearest a right boundary is sample 0 with a distance 1−0.909=0.091. These distances are in image the image space. Converting back to output space using the scale factor gives left and right distances 0.636*1.1=0.7 and 0.091*1.1=0.1.

Since 0.1<0.25, the image cannot be shifted left one quantisation level without changing the output image. This is expected because −0.5 is already the largest left-shift possible. The image can however be shifted right floor(0.7/0.25)=2 quantisation levels, shown in 1502 and 1503. So the lookup table for quantisation levels 0, 1 and 2 all contain 0.

Assuming the sub-pixel placements are encountered in the order −0.5, −0.25, 0.0, 0.25, the following table shows the lookup table values after updating with each sub-pixel offset.

| Sub-pixel offset | Table 0 | Table 1 | Table 2 | Table 3 | Identifier |
|---|---|---|---|---|---|
| −0.5 | 0 | 0 | 0 | None | 0 |
| −0.25 | 0 | 0 | 0 | None | 0 |
| 0 | 0 | 0 | 0 | None | 0 |
| 0.25 | 0 | 0 | 0 | 3 | 3 |

INDUSTRIAL APPLICABILITY

The arrangements described are applicable to the computer and data processing industries and particularly for the printing of transformed images.

The foregoing describes only some embodiments of the present invention, and modifications and/or changes can be made thereto without departing from the scope and spirit of the invention, the embodiments being illustrative and not restrictive.

We claim:

1. A method of printing an transformed image corresponding to a source image, said method comprising:
    determining at least a first scale factor to upscale said source image to generate said transformed image, said first scale factor being at a first mathematical precision;
    enlarging said source image along at least two orthogonal edges of said source image to form an enlarged area defining an enlarged source image;
    copying pixel data along the at least two orthogonal edges of the source image into the enlarged area of said enlarged source image; and
    mapping each pixel of said transformed image back to a corresponding pixel of the enlarged source image including the copied pixel data along the at least two orthogonal edges of the source image.

2. The method of claim 1, further comprising:
    determining a second scale factor, said second scale factor being at a second mathematical precision;
    wherein each pixel of said transformed image is mapped back to a corresponding pixel in said enlarged source image using said second scale factor.

3. The method of claim 1, in which the enlarging step comprises copying entropy coded data and the second copying step involves copying and flipping the entropy coded data in an enlarged potion of said enlarged source image.

4. The method of claim 1, wherein a geometric transformation by which the transformed image is formed is one or more of: upscaling, rotation, and shearing.

5. The method according to claim 1, wherein the copied pixel data is compressed.

6. The method according to claim 5, wherein the compressed pixel data is copied without decompressing to pixel values.

7. The method according to claim 5, wherein copying comprises copying frequency encoded pixel data.

8. The method according to claim 7, wherein copying comprises rearranging frequency encoded pixel data.

9. The method according to claim 8, wherein frequency encoded pixel data is rearranged by reordering DCT coefficients.

10. The method according to claim 8, wherein mapping further comprises:
    decompressing the rearranged frequency encoded data to pixel values to form a decompressed enlarged source image; and
    mapping each pixel of said transformed image back to a corresponding pixel into the decompressed enlarged source image including pixels derived from the copied frequency encoded pixel data.

11. A non-transitory computer readable storage medium having a program recorded thereon, the program being executable by computer apparatus to print a transformed image corresponding to a source image, said program comprising:
    code for determining at least a first scale factor to upscale said source image to generate said transformed image, said first scale factor being at a first mathematical precision;
    code for enlarging said source image along at least two orthogonal edges of said source image to form an enlarged area defining an enlarged source image;
    code for copying pixel data along the at least two orthogonal edges of the source image into the enlarged area of said enlarged source image; and
    code for mapping each pixel of said transformed image back to a corresponding pixel into the enlarged source image including the copied pixel data along the at least two orthogonal edges of the source image.

12. The computer readable storage medium of claim 11, further comprising:
    code for determining a second scale factor, said second scale factor being at a second mathematical precision;
    wherein each pixel of said transformed image is mapped back to a corresponding pixel in said enlarged source image using said second scale factor.

13. The computer readable storage medium of claim 11, in which the code for enlarging comprises code for copying entropy coded data and the second copying step involves copying and flipping the entropy coded data in an enlarged potion of said enlarged source image.

14. The computer readable storage medium of claim 11, wherein a geometric transformation by which the transformed image is formed is one or more of: upscaling, rotation, and shearing.

15. Computer apparatus of printing an transformed image corresponding to a source image, said computer apparatus comprising:

means for determining at least a first scale factor to upscale said source image to generate said transformed image, said first scale factor being at a first mathematical precision;

means for enlarging said source image along at least two orthogonal edges of said source image to form an enlarged area defining an enlarged source image;

means for copying pixel data along the at least two orthogonal edges of the source image into the enlarged area of said enlarged source image; and means for mapping each pixel of said transformed image back to a corresponding pixel into the enlarged source image including the copied pixel data along the at least two orthogonal edges of the source image.

* * * * *